(12) United States Patent
Zhou et al.

(10) Patent No.: US 11,921,088 B2
(45) Date of Patent: Mar. 5, 2024

(54) THERMAL-STRESS-PORE PRESSURE COUPLED ELECTROMAGNETIC LOADING TRIAXIAL HOPKINSON BAR SYSTEM AND TEST METHOD

(71) Applicant: SHENZHEN UNIVERSITY, Shenzhen (CN)

(72) Inventors: Tao Zhou, Shenzhen (CN); Heping Xie, Shenzhen (CN); Jianbo Zhu, Shenzhen (CN); Jian Zhao, Shenzhen (CN); Tianqi Zhai, Shenzhen (CN); Mingzhong Gao, Shenzhen (CN); Cunbao Li, Shenzhen (CN); Zhiyi Liao, Shenzhen (CN); Kai Zhang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 317 days.

(21) Appl. No.: 17/568,929

(22) Filed: Jan. 5, 2022

(65) Prior Publication Data

US 2022/0128442 A1     Apr. 28, 2022

Related U.S. Application Data

(63) Continuation of application No. PCT/CN2019/115488, filed on Nov. 5, 2019, and a
(Continued)

(30) Foreign Application Priority Data

Aug. 1, 2019 (CN) .......................... 201910707506.9
Aug. 1, 2019 (CN) .......................... 201910708107.4

(51) Int. Cl.
*G01N 3/317* (2006.01)

(52) U.S. Cl.
CPC ....... *G01N 3/317* (2013.01); *G01N 2203/001* (2013.01); *G01N 2203/0019* (2013.01);
(Continued)

(58) Field of Classification Search
CPC ............ G01N 3/317; G01N 2203/001; G01N 2203/0019; G01N 2203/0048;
(Continued)

(56) References Cited

FOREIGN PATENT DOCUMENTS

CN        103852373 A       6/2014
CN        104535409 A   *   4/2015   .............. G01N 3/00
(Continued)

OTHER PUBLICATIONS

International Search Report (with English translation) and Written Opinion (with Machine translation) dated Mar. 26, 2020 in corresponding International Patent Application No. PCT/CN2019/115487; 9 pages.
(Continued)

*Primary Examiner* — Marrit Eyassu
(74) *Attorney, Agent, or Firm* — Maier & Maier, PLLC

(57) ABSTRACT

The present disclosure provides a thermal-stress-pore pressure coupled electromagnetic loading triaxial Hopkinson bar system and test method, the system mainly consists of an electromagnetic pulse generation system, a servo-controlled axial pressure loading system, a servo-controlled confining pressure loading system, a thermal control system, a pore pressure loading system, a bar system, and a data monitoring and acquisition system. Based on the conventional Hopkinson bar, the present disclosure creatively introduces a real-time loading and control system for confining pressure, thermal, and pore pressure, aiming to solve the technical problem that the existing test apparatus cannot be used to study dynamic response of deep rock mass under the cou-
(Continued)

pling effect of thermal-stress-pore pressure and dynamic disturbance during dynamic impact loading.

11 Claims, 8 Drawing Sheets

Related U.S. Application Data continuation of application No. PCT/CN2019/115487, filed on Nov. 5, 2019.

(52) U.S. Cl.
CPC ............. *G01N 2203/0048* (2013.01); *G01N 2203/005* (2013.01); *G01N 2203/0075* (2013.01); *G01N 2203/0098* (2013.01); *G01N 2203/0224* (2013.01); *G01N 2203/0256* (2013.01)

(58) Field of Classification Search
CPC ..... G01N 2203/005; G01N 2203/0075; G01N 2203/0098; G01N 2203/0224; G01N 2203/0256

USPC ....... 73/12.09, 789, 790, 803, 813, 818, 825
See application file for complete search history.

(56) References Cited

FOREIGN PATENT DOCUMENTS

| CN | 104596852 | A | * | 5/2015 | |
|----|-----------|---|---|--------|---|
| CN | 104819926 | A |   | 8/2015 | |
| CN | 204789116 | A |   | 11/2015 | |
| CN | 204789116 | U | * | 11/2015 | |
| CN | 107014689 | A |   | 8/2017 | |
| CN | 108645562 | A | * | 10/2018 | ............. G01L 25/00 |
| JP | 10318897  | A |   | 12/1998 | |

OTHER PUBLICATIONS

International Search Report (with English translation) and Written Opinion (with Machine translation) dated Apr. 24, 2020 in corresponding International Patent Application No. PCT/CN2019/115488; 9 pages.

* cited by examiner

THERMAL-STRESS-PORE PRESSURE COUPLED ELECTROMAGNETIC LOADING TRIAXIAL HOPKINSON BAR SYSTEM AND TEST METHOD

CROSS-REFERENCE TO RELATED APPLICATIONS

This application is a Bypass Continuation Application of PCT Patent Application No. PCT/CN2019/115487, filed on Nov. 5, 2019, and PCT Patent Application No. PCT/CN2019/115488, filed on Nov. 5, 2019. Furthermore, the application claims priority to Chinese Patent Application No. 201910707506.9, filed on Aug. 1, 2019, and Chinese Patent Application No. 201910708107.4, filed on Aug. 1, 2019. The content of all aforesaid applications is incorporated herein by reference.

TECHNICAL FIELD

The present disclosure relates to the field of rock dynamics research, and more particularly to a thermal-stress-pore pressure coupled electromagnetic loading triaxial Hopkinson bar system for studying dynamic mechanical properties and fracture behavior of deep underground rock under multi-field coupling conditions.

BACKGROUND

With the depletion of shallow mineral resources, the exploitation of resources and energy has gradually turned to deep underground. At present, in the world, the coal mining depth has reached 1500 m underground; the metal mineral mining depth has exceeded 4000 m; and the oil drilling depth has reached 7500 m underground. In deep mining, the deep rock mass is in a very complex environment, facing the conditions of high geostress, high ground temperature, high water pressure, and strong engineering disturbance (for example, blast wave, earthquake, and rock burst), resulting in frequent occurrence and difficult prediction and effective control of engineering disasters (for example, rock burst, coal bump), which seriously endangers the safe construction and operation of deep rock mass engineering. Therefore, studying and mastering dynamic mechanical properties and fracture behavior of deep rock under the conditions of high geostress, high ground temperature, high water pressure and strong engineering disturbance have great scientific and practical significance for the construction and operation of the deep rock mass engineering. At present, the researches on the above problem mainly focus on the research on rock property and fracture mechanism under the coupling effect of thermal-stress-pore pressure subjected to static loading conditions using the MTS815 device (an electro-hydraulic servo-controlled rock test system), while the studies on the rock dynamic mechanical properties and the fracture behavior under the coupled effect of deep thermal-stress-pore pressure have not been reported. The main reason is that the experimental methods for studying rock dynamics under complex deep conditions, especially the experimental means and equipment for studying the rock dynamics response and the fracture mechanism under the coupled effect of thermal-stress-pore pressure, are extremely deficient. At present, both the rock dynamic impact tests based on a one-dimensional Hopkinson bar and the research on the rock dynamic mechanical properties under the coupled dynamic-static impact loading using a modified Hopkinson bar can only partially simulate the static pressure and disturbance load environment of deep rock mass. Both of those two devices cannot be applied to conduct the research on rock dynamics property in a simulated environment close to the real deep rock mass environment, and therefore the results obtained from the experiments conducted on these two devices cannot truly, effectively, and comprehensively reflect the dynamic mechanical properties and the failure behavior of the deep in-situ rock mass under the deep complex conditions. In addition, the researches on the rock dynamic mechanical properties in a thermal environment, especially under a thermal-stress coupled condition, have been frequently reported. However, in most of the existing thermal-stress coupled dynamic-impact loaded researches, a rock specimen is first heated to a preset temperature, and then cooled; and the cooled rock is subsequently used to conduct the research on the rock dynamic mechanical properties under dynamic impact loading or coupled dynamic-static impact loading with a Hopkinson bar system. The above researches help us understand the influence of temperature on the rock dynamic mechanical properties and the fracture behavior. However, in fact, the above researches are far from the rock dynamic mechanical properties and the dynamic fracture behavior in the real deep thermal-stress-pore pressure coupled environment. Therefore, the prior art still needs to be improved.

SUMMARY

In order to solve the problem that the existing test apparatus cannot be used to conduct the research on the dynamic mechanical properties and the fracture behavior of deep rock under the conditions of high geostress, high ground temperature, high water pressure and strong engineering disturbance, the present disclosure provides a thermal-stress-pore pressure coupled electromagnetic loading triaxial Hopkinson bar system. The system creatively introduces a real-time thermal loading and controlling system, and a real-time pore pressure loading and controlling system on the basis of the conventional Hopkinson bar, aiming to solve the technical problem that the existing test apparatus cannot be applied to study the dynamic response of deep rock mass under the coupled effect of thermal-stress-pore pressure and dynamic disturbed loading conditions.

The thermal-stress-pore pressure coupled electromagnetic loading triaxial Hopkinson bar system mainly consists of an electromagnetic pulse generation system, a servo-controlled axial pressure loading system, a confining-pressure loading apparatus, a servo-controlled confining pressure loading system, a thermal control system, a pore pressure loading system, a bar system, and a data monitoring and acquisition system.

The thermal-stress-pore pressure coupled electromagnetic loading triaxial Hopkinson bar system uses a support platform as a basic platform, and is arranged symmetrically, wherein the support platform is used to bear the dead weight of the entire system and the impact load during testing, and is also used to roughly level the system. The electromagnetic pulse generation system mainly consists of a left electromagnetic pulse generator and a right electromagnetic pulse generator with the same machining parameter, process and function, and a control system thereof, and is mainly used to provide dynamic loads (incident stress wave) for the system. The servo-controlled axial pressure loading system mainly consists of a left axial pressure loading and fixing baffle, a right axial pressure loading and fixing baffle, connecting rods, a left axial pressure loading cylinder, a right axial pressure loading cylinder, an axial pressure loading piston, and an axial pressure servo control system, and is used to provide a static prestress (static axial pressure) to the test specimen; the servo-controlled axial pressure loading system has the functions of programmatically controlling the loading, holding and unloading of an oil source system, and can ensure that the static axial pressure remains relatively stable during testing. The confining-pressure loading apparatus and the servo-controlled confining pressure loading system mainly consist of a confining-pressure loading cylinder enclosure, a confining-pressure loading cylinder, threaded rods, a confining-pressure loading cylinder oil inlet, a confining-pressure loading cylinder air outlet, a sealing plug of the confining-pressure loading cylinder air outlet, a confining pressure oil pressure gauge, and a confining pressure servo control system, and are mainly used to provide a circumferential static prestress (static circumferential confining pressure) for the test specimen; the servo-controlled confining pressure loading system has the functions of programmatically controlling the loading, holding and unloading of the oil source system, and can ensure that the static circumferential confining pressure remains relatively stable during testing. The thermal control system mainly consists of an intelligent thermal control thermocouple and thermal sensor and a thermal control software system, and is mainly used to heat the test specimen and maintain the temperature at a preset value. The pore pressure loading system mainly consists of a left pore pressure pipe, a right pore pressure pipe, and a pore pressure loading and controlling system, and is mainly used to provide pore water pressure and pore pressure for the test specimen or provide internal water pressure for the test specimen with internal holes. The loading bar system mainly consists of a left stress wave loading bar and a right stress wave loading bar satisfying different test requirements, made from the same material, and having the same diameter and length, and is mainly used to transfer the static prestress and the incident stress wave and apply a dynamic load to the test specimen. The data monitoring and acquisition system consists of a synchronous multi-channel high-speed recorder, strain gauges, Wheatstone bridges, and a strain signal amplifier, and is used to monitor, record and store test signals in real time.

A thermal-stress-pore pressure coupled electromagnetic loading triaxial Hopkinson bar system, including a support platform, a left axial pressure loading and fixing baffle, a left axial pressure loading cylinder, a left axial pressure loading piston, a left electromagnetic pulse generator, a left electromagnetic pulse generator support, connecting rods, a left stress wave loading bar, a stress wave loading bar support, resistance strain gauges, a right axial pressure loading and fixing baffle, a right axial pressure loading cylinder, a right axial pressure loading piston, a right electromagnetic pulse generator, a right electromagnetic pulse generator support, a right stress wave loading bar, a confining-pressure loading cylinder enclosure, a confining-pressure loading cylinder, a threaded rod, a confining-pressure loading cylinder oil inlet, a confining-pressure loading cylinder air outlet, a sealing plug of the confining-pressure loading cylinder air outlet, a confining pressure oil pressure gauge, a left pore pressure pipe, a right pore pressure pipe, an external power outlet of a thermal system, an intelligent thermal control thermocouple and thermal sensor, a rubber sleeve, and a test specimen, wherein the system centers on the test specimen, and is arranged symmetrically; the left axial pressure loading and fixing baffle and the right axial pressure loading and fixing baffle are fixed at the left end and the right end of the support platform, respectively; a central mounting hole and peripheral mounting holes are disposed in the centers of and on the peripheries of the left axial pressure loading and fixing baffle and the right axial pressure loading and fixing baffle, respectively; the left axial pressure loading cylinder and the right axial pressure loading cylinder respectively penetrate through the central mounting holes of the left axial pressure loading and fixing baffle and the right axial pressure loading and fixing baffle, and are welded therewith to form an overall structure; in addition, the left axial pressure loading and fixing baffle and the right axial pressure loading and fixing baffle are connected into a whole by the connecting rods through the peripheral mounting holes on the peripheries thereof, and form an overall frame system together with the support platform; the left electromagnetic pulse generator is supported by the left electromagnetic pulse generator support, and is placed on the support platform, wherein the left end of the left electromagnetic pulse generator is freely attached to the right end of the left axial pressure loading piston, such that a static axial pressure provided by the left axial pressure loading cylinder is transferred to the left electromagnetic pulse generator by means of the left axial pressure loading piston; the left stress wave loading bar is supported by the stress wave loading bar support, and is placed on the support platform, wherein the left end of the left stress wave loading bar is freely attached to the right end of the left electromagnetic pulse generator; on one hand, the static axial pressure transferred to the left electromagnetic pulse generator is further transferred to the left stress wave loading bar, and finally applies to the test specimen; on the other hand, an incident stress wave generated by the left electromagnetic pulse generator is inputted into the left stress wave loading bar, and then propagates along the axial direction thereof until applying a dynamic load from left to right to the test specimen;

similarly, the right electromagnetic pulse generator is supported by the right electromagnetic pulse generator support, and is placed on the support platform, wherein the right end of the right electromagnetic pulse generator is freely attached to the left end of the right axial pressure loading piston, such that a static axial pressure provided by the right axial pressure loading cylinder is transferred to the right electromagnetic pulse generator by means of the right axial pressure loading piston; the right stress wave loading bar is supported by the stress wave loading bar support, and is placed on the support platform, wherein the right end of the right stress wave loading bar is freely attached to the left end of the right electromagnetic pulse generator; on one hand, the static axial pressure transferred to the right electromagnetic pulse generator is further transferred to the right stress wave loading bar, and finally applies to the test specimen; on the other hand, an incident stress wave generated by the right electromagnetic pulse generator is inputted into the right stress wave loading bar, and then propagates along the axial direction thereof until applying a dynamic load from right to left to the test specimen; the resistance strain gauges are pasted on the left stress wave loading bar and the right stress wave loading bar, respectively;

a confining-pressure loading apparatus is composed of a confining-pressure loading cylinder enclosure, a confining-pressure loading cylinder, threaded rods, a confining-pressure loading cylinder oil inlet, a confining-pressure loading cylinder air outlet, a sealing plug of the confining-pressure loading cylinder air outlet, and a confining pressure oil pressure gauge, wherein a central mounting hole and peripheral mounting holes are disposed in the center of and on the periphery of the confining-pressure loading cylinder enclosure, respectively, which is used to extend the left stress wave loading bar and the right stress wave loading bar through the central mounting hole into the interior of the confining pressure loading cylinder to contact the test specimen; the threaded rods penetrate through the peripheral mounting holes of the confining-pressure loading cylinder enclosure, such that the confining-pressure loading cylinder enclosure and the confining-pressure loading cylinder are connected to form an overall structure, and are placed on the support platform; in addition, a confining-pressure loading cylinder oil inlet and a confining-pressure loading cylinder air outlet are disposed at the upper part and lower part of the central mounting hole of the right enclosure of the confining-pressure loading cylinder enclosure, respectively; the confining-pressure loading cylinder oil inlet and the confining-pressure loading cylinder air outlet form an intercommunication loop of the confining-pressure loading apparatus; the intercommunication loop is used to pump hydraulic oil into the confining-pressure loading cylinder to apply a circumferential static confining pressure to the test specimen wrapped in the rubber sleeve; the sealing plug of the confining-pressure loading cylinder air outlet is disposed on an outer side of the confining-pressure loading cylinder air outlet; and the static confining pressure is displayed on the confining pressure oil pressure gauge.

As a further improvement of the present disclosure, the system comprises a thermal control apparatus; the thermal control apparatus comprises an external power outlet of a thermal system and an intelligent thermal control thermocouple and thermal sensor, and is used to heat the test specimen and maintain the temperature at a preset value; during heating, a control system controls the intelligent thermal control thermocouple and thermal sensor to raise the temperature of the hydraulic oil pumped into the confining-pressure loading cylinder at a temperature rise rate set according to test requirement, and transfers the heat to the test specimen wrapped in the rubber sleeve; the control system controls the thermocouple, and sets a temperature rise rate and a temperature range; then, an intelligent thermal control sensor feeds back the real time temperature to a display system, ensuring to heat to a preset temperature; after heating to the preset temperature, a rock dynamics test is conducted, achieving in-situ heating the test specimen to a specified temperature.

As a further improvement of the present disclosure, the left axial pressure loading and fixing baffle and the right axial pressure loading and fixing baffle are connected into a whole by four connecting rods through four peripheral mounting holes on the peripheries thereof.

As a further improvement of the present disclosure, the central mounting holes and peripheral mounting holes of the left axial pressure loading and fixing baffle, the right axial pressure loading and fixing baffle, and the confining-pressure loading cylinder enclosure are all circular holes.

As a further improvement of the present disclosure, the system further includes a pore pressure loading apparatus; the pore pressure loading apparatus comprises a left pore pressure pipe and a right pore pressure pipe, wherein the diameters and lengths of the left pore pressure pipe and the right pore pressure pipe are both the same; the two pore pressure pipes are built in the right end of the left stress wave loading bar and the left end of the right stress wave loading bar, respectively, and directly contact the loading ends of the test specimen; when a pore pressure is applied, a pore liquid with a preset pressure is injected into the left pore pressure pipe; the pore liquid, under the drive of the pore pressure, passes through the internally connected pore throat channels inside the test specimen, and is discharged from the right pore pressure pipe; and the pore pressure is maintained constant at a preset value.

As a further improvement of the present disclosure, the diameter of the central mounting hole of the confining-pressure loading cylinder enclosure is 1±0.1 mm greater than the diameter of the left stress wave loading bar and the right stress wave loading bar.

As a further improvement of the present disclosure, the intelligent thermal control thermocouple and thermal sensor is an annular structure, and is built in the circumferential cylinder wall of the confining-pressure loading cylinder; the temperature rise rate of the intelligent thermal control thermocouple and thermal sensor is controlled by the control system; and the intelligent thermal control thermocouple and thermal sensor feeds back a real time temperature to the display system, ensuring to heat to the preset temperature.

As a further improvement of the present disclosure, the resistance strain gauges are pasted at central positions of the left stress wave loading bar and the right stress wave loading bar.

As a further improvement of the present disclosure, the oil pressure gauge of the confining pressure is disposed at an upper part of the right enclosure of the confining-pressure loading cylinder enclosure.

As a further improvement of the present disclosure, the left stress wave loading bar and the right stress wave loading bar can freely slide on the stress wave loading bar support.

A test method for a thermal-stress-pore pressure coupled electromagnetic loading triaxial Hopkinson bar system, using any one system to conduct a test, and specifically comprising the following steps:

first, the servo-controlled axial pressure loading system is used to synchronously control the left axial pressure loading cylinder and the right axial pressure loading cylinder to boost the pressures of the two axial pressure loading cylinders and drive the left axial pressure loading piston and the right axial pressure loading piston to move rightwards and leftwards respectively, so as to push the left stress wave loading bar and the right stress wave loading bar to apply axial pressures to the test specimen at a preset loading rate, respectively; when the axial pressure reaches a preset value, stopping loading and using the servo-controlled axial pressure loading system to maintain the axial pressure stable;

second, using the servo-controlled confining pressure loading system to pump anti-wear hydraulic oil into the confining-pressure loading cylinder at a preset rate by means of a confining-pressure loading cylinder oil inlet; when the hydraulic oil flows out from the confining-pressure loading cylinder air outlet, which means that the confining-pressure loading cylinder is already full of the anti-wear hydraulic oil, tightening the sealing plug of the confining-pressure loading cylinder air outlet to seal the confining-pressure loading cylinder air outlet, and continuously applying the confining pressure; when the pressure value on the oil pressure gauge reaches a preset confining pressure value, stopping loading and using the servo-controlled confining pressure loading system to maintain the confining pressure stable, such that a circumferential confining pressure applied to the test specimen by means of an impermeable rubber sleeve maintains stable at a preset value; third, using the pore pressure loading system to apply a pore pressure to the test specimen by means of the left pore pressure pipe and the right pore pressure pipe; when the pressure difference between the pore pressures in the left pore pressure pipe and the right pore pressure pipe maintains stable at a preset value, activating the thermal control system, and driving the intelligent thermal control thermocouple and thermal sensor to heat at a preset rate; when the temperature of the hydraulic oil in the confining-pressure loading cylinder rises to a preset temperature, braking the thermal control system to maintain the temperature of the oil in the hydraulic cylinder at the preset experimental temperature by two hours, so that the temperature inside the test specimen wrapped in the high temperature resistant anti-wear rubber sleeve is uniform and maintains constant at the preset temperature, so as to complete the condition of applying the coupled effect of a static axial pressure, a confining pressure, a pore pressure, and a temperature to the test specimen; and fourth, operating, according to a test design, an electromagnetic pulse generation control system to drive the left electromagnetic pulse generator and the right electromagnetic pulse generator to synchronously generate and output incident stress waves; subsequently, enabling the incident stress waves to propagate towards the test specimen along the left and the right stress wave loading bars respectively, and loading a dynamic impact to the test specimen, so as to achieve a thermal-stress-pore pressure coupled electromagnetic loading triaxial Hopkinson bar test.

During dynamic impact loading, the incident strain signal and the reflected strain signal in the stress wave loading bars are monitored in real time by means of resistance strain gauges adhered at central positions of the left and the right loading bars; when the strain signal data monitored by the strain gauges shows that during the thermal-stress-pore pressure coupled electromagnetic loading triaxial Hopkinson bar test, the dynamic compression loads applied to the left and right ends of the test specimen are basically consistent, the dynamic impact loading process of the test specimen can be considered to reach a stress balance state. According to one-dimensional strain wave propagation theory, the dynamic compression strength σ(t), the dynamic compression strain rate $\dot{\varepsilon}(t)$, and the axial strain ε(t) of the test specimen can be calculated with the strain data monitored by the strain gauges using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are elastic modulus, compressional wave velocity, and cross-sectional area of the stress wave loading bar, respectively; $A_s$ is a cross-sectional area of the test specimen; $L_s$ is the length of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

As a further improvement of the present disclosure, the resistance strain gauges transmit the incident strain signals and the reflected strain signals in the stress wave loading bars to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing.

The beneficial effects of the present disclosure are:

(1) in the thermal-stress-pore pressure coupled electromagnetic loading triaxial Hopkinson bar system, the electromagnetic pulse generation system is able to precisely and highly repetitively generate incident stress waves, which solves the technical problem that the existing Hopkinson bar device is difficult to precisely control and highly repeatedly generate the incident stress waves.

(2) the dynamic loads of the thermal-stress-pore pressure coupled electromagnetic loading triaxial Hopkinson bar system is synchronously controlled and loaded by the bidirectional electromagnetic pulse generation system, which overcomes the defect that the conventional Hopkinson bar can only apply a dynamic load to the test specimen from one direction; meanwhile, the incident stress waves are synchronously controlled and loaded from two symmetrical directions which shortens the time for the specimen to reach dynamic stress balance to approximately ⅓ of the conventional loading from one direction, thereby improving the effectiveness and reliability of dynamic test results; at the same time, it can also avoid pre-fracture phenomenon that affects the effectiveness of the test results due to the long time taken for the brittle sample to reach equilibrium.

(3) in the thermal-stress-pore pressure coupled electromagnetic loading triaxial Hopkinson bar system, the servo-controlled axial pressure loading system and the servo-controlled confining pressure loading system can achieve servo-controlled loading of the static axial pressure and static circumferential confining pressure, and can maintain the axial pressure and the confining pressure relatively stable during dynamic impact loading process, thereby overcoming the defect that the existing modified triaxial Hopkinson bar cannot maintain the axial pressure and the confining pressure relatively stable during dynamic impact loading.

(4) in the thermal-stress-pore pressure coupled electromagnetic loading triaxial Hopkinson bar system, the thermal loading and controlling system can heat the test specimen under the application of the triaxial static pressure or the coupled triaxial static pressure and the pore pressure, and can maintain the temperature at a preset value, achieving a dynamic impact loading test under the coupled effect of thermal-stress or thermal-stress-pore pressure, which solve the technical problem that the existing Hopkinson bar system cannot be used to study rock dynamic properties under the multi-field coupling of thermal-stress or thermal-stress-pore pressure during dynamic impact loading, and enable a test process to be closer to a real stress environment, and enable the test result to be more reliable and accurate.

(5) in the thermal-stress-pore pressure coupled electromagnetic loading triaxial Hopkinson bar system, the pore pressure loading system can apply pore pressure and pore water pressure to the test specimen under the application of the triaxial static pressure or the coupled effect of triaxial static pressure and the temperature, and can also provide an water pressure for the test specimen with internal holes or pores, and can maintain the pore pressure, pore water pressure, and the water pressure inside the internal holes or pores at preset values; the present disclosure achieves a dynamic impact loading test under the coupled effect of pressure-pore pressure or thermal-stress-pore pressure, thereby filling the technical gap that the existing Hopkinson bar system cannot be used to investigate rock dynamic properties under the multi-field coupling of pressure-pore pressure or thermal-stress-pore pressure during dynamic impact loading, and enabling the test process to be closer to a real triaxial stress environment, and enabling the test result to be more reliable and accurate.

Reference signs corresponding to the components in the figures are as follows:

1, support platform; 2, left axial pressure loading and fixing baffle; 3, left axial pressure loading cylinder; 4, left axial pressure loading piston; 5, left electromagnetic pulse generator; 6, left electromagnetic pulse generator support; 7, connecting rod; 8, left stress wave loading bar; 9, stress wave loading bar support; 10, strain gauge; 11, right axial pressure loading and fixing baffle; 12, right axial pressure loading cylinder; 13, right axial pressure loading piston; 14, right electromagnetic pulse generator; 15, right electromagnetic pulse generator support; 16, right stress wave loading bar; 17, confining-pressure loading cylinder enclosure; 18, confining-pressure loading cylinder; 19, threaded rod; 20, confining-pressure loading cylinder oil inlet; 21, confining-pressure loading cylinder air outlet; 22, sealing plug of the confining-pressure loading cylinder air outlet; 23, confining pressure oil pressure gauge; 24, left pore pressure pipe; 25, right pore pressure pipe; 26, external power outlet of a thermal system; 27, intelligent thermal control thermocouple and thermal sensor; 28, rubber sleeve; 29, test specimen; and 30, cylindrical hole.

DETAILED DESCRIPTION OF THE EMBODIMENTS

The present disclosure will be further described hereafter with reference to the accompanying drawings.

Figure 1:
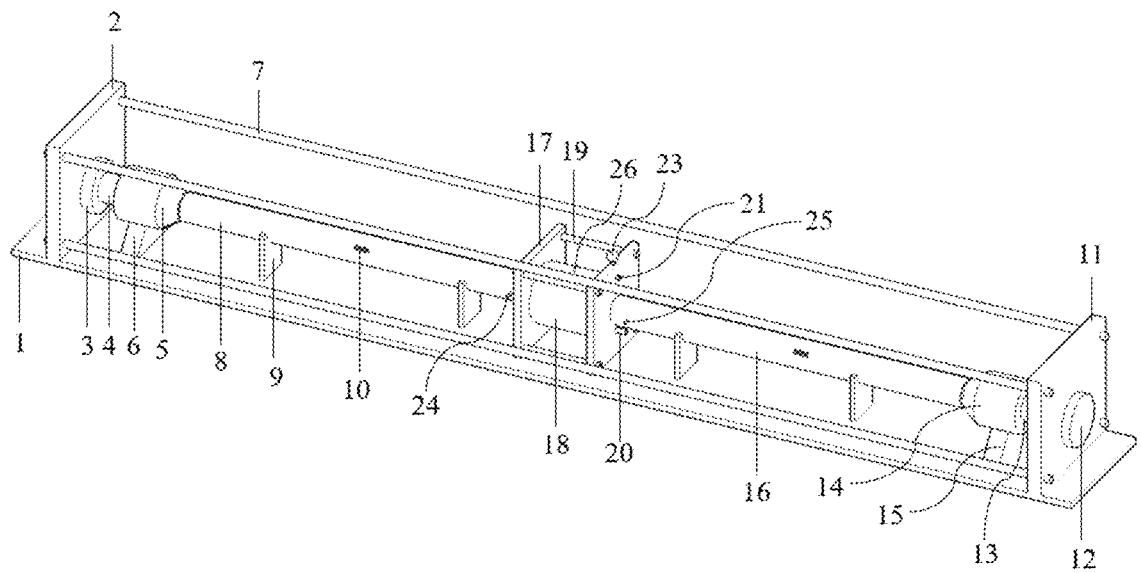
FIG. 1 is a three-dimensional view of a thermal-stress-pore pressure coupled electromagnetic loading triaxial Hopkinson bar system.
Figure 3:
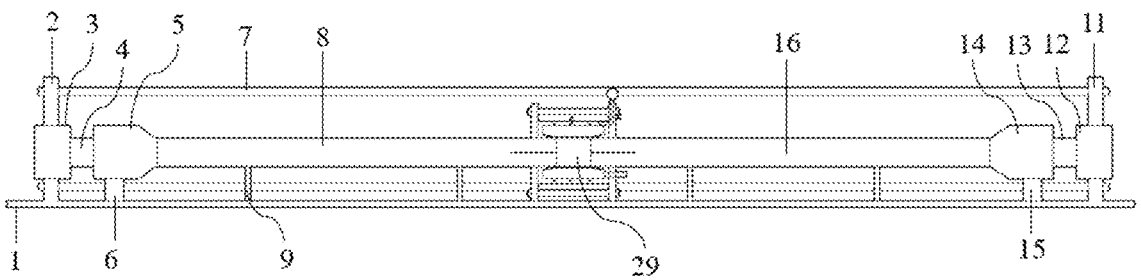
FIG. 3 is a front view of a section of the thermal-stress-pore pressure coupled electromagnetic loading triaxial Hopkinson bar system.
Figure 4:
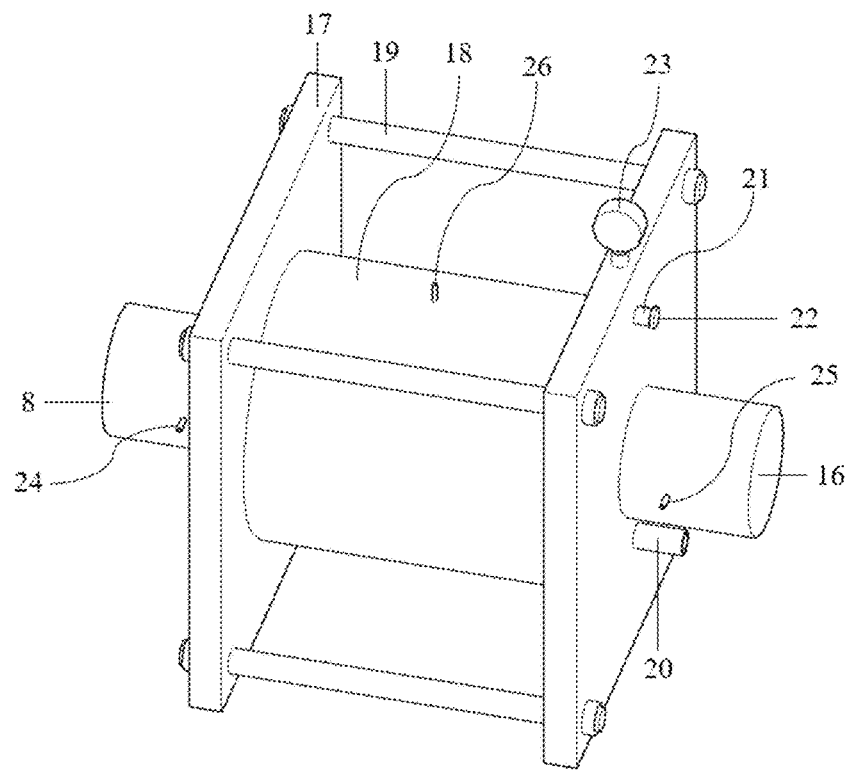
FIG. 4 is a three-dimensional view of a thermal-stress-pore pressure coupled confining-pressure loading apparatus.
Figure 5:
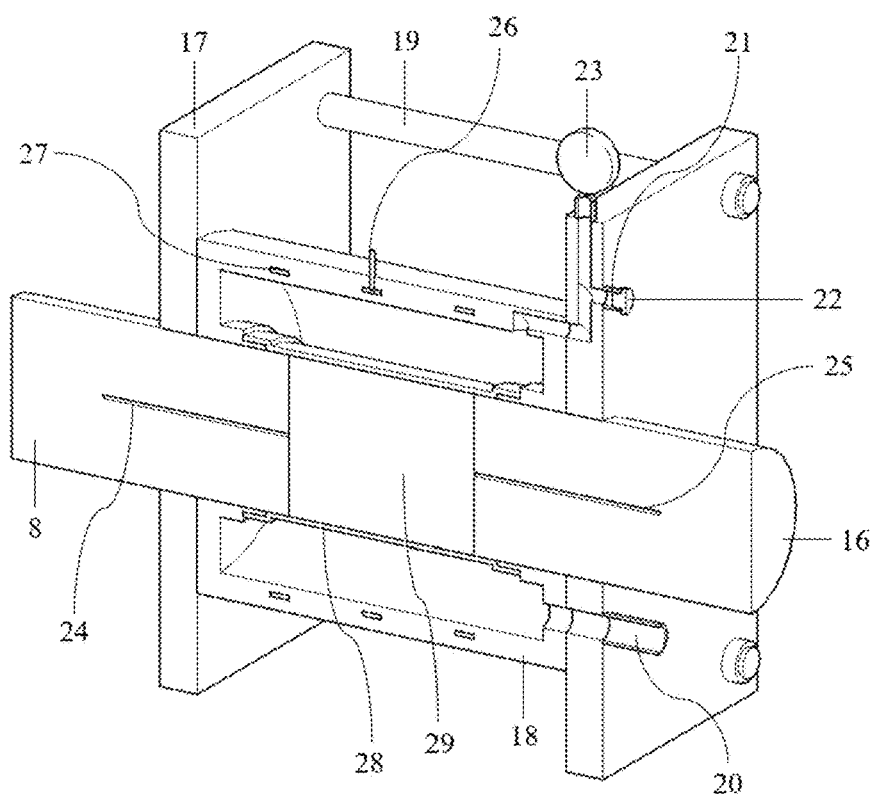
FIG. 5 is a three-dimensional sectional view of the thermal-stress-pore pressure coupled confining-pressure loading apparatus in a front view direction.
Figure 6:
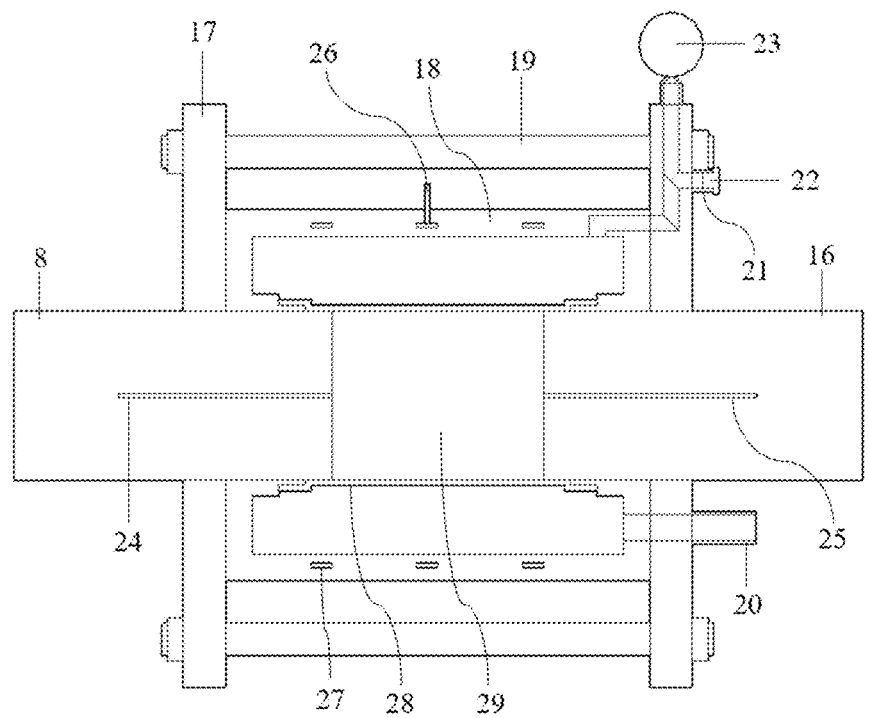
FIG. 6 is a front view of a section of the thermal-stress-pore pressure coupled confining-pressure loading apparatus.
Figure 7:
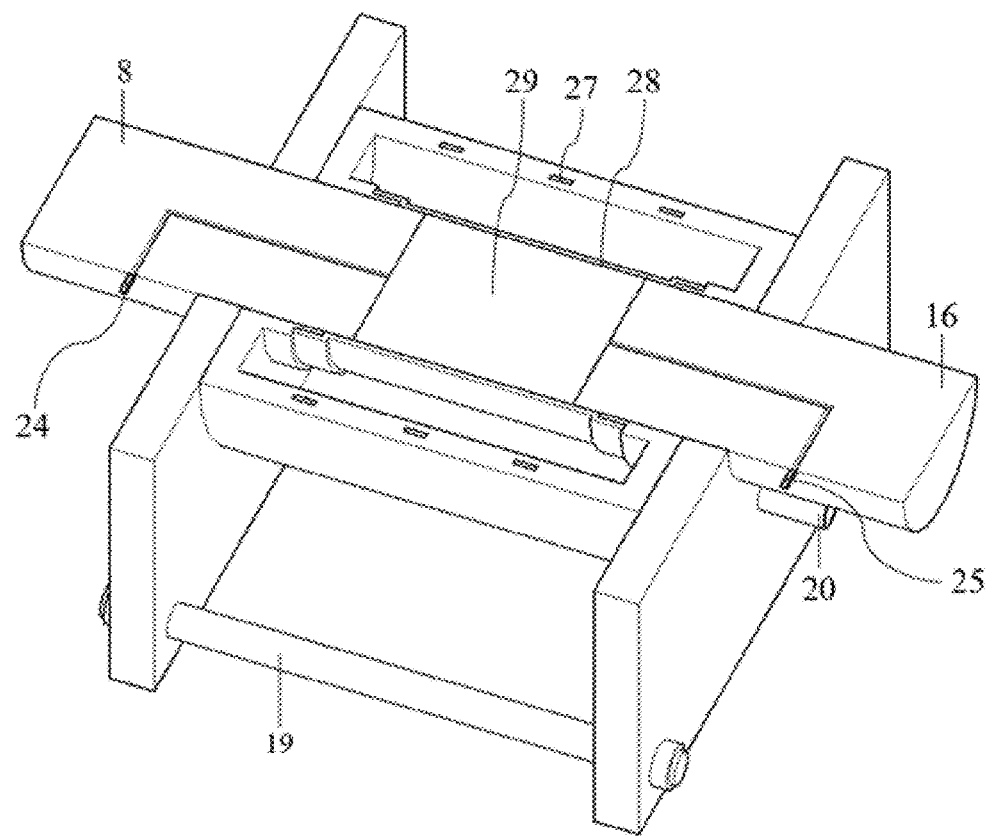
FIG. 7 is a three-dimensional sectional view of the thermal-stress-pore pressure coupled confining-pressure loading apparatus in a vertical view direction.
Figure 8:
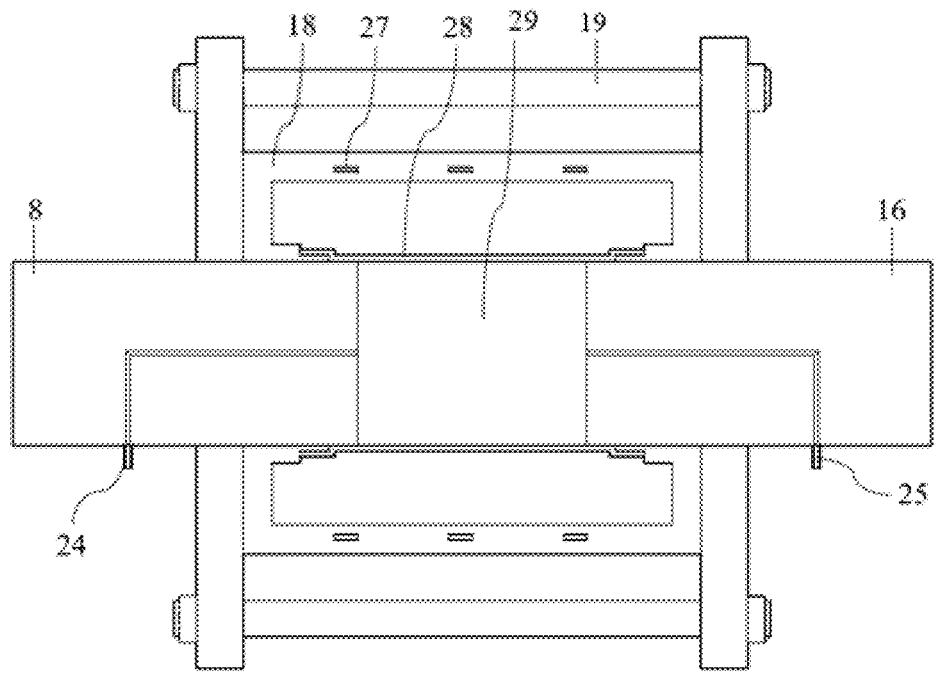
FIG. 8 is a vertical view of a section of the thermal-stress-pore pressure coupled confining-pressure loading apparatus.

In one embodiment of the present disclosure, as shown in FIG. 1 which is a three-dimensional view of a thermal-stress-pore pressure coupled electromagnetic loading triaxial Hopkinson bar system, a test apparatus is disposed on a support platform 1, and mainly consists of an electromagnetic pulse generation system, a servo-controlled axial pressure loading system, a confining-pressure loading apparatus, a servo-controlled confining pressure loading system, a thermal control system, a pore pressure loading system, a bar system, and a data monitoring and acquisition system. The system centers on a test specimen 29 (as shown in FIG. 3), and is symmetrically arranged on the support platform, wherein a left axial pressure loading and fixing baffle 2 and a right axial pressure loading and fixing baffle 11 are respectively fixed at the left end and the right end of the support platform 1; a central mounting hole and peripheral mounting holes are disposed in the centers of and on the peripheries of the left axial pressure loading and fixing baffle and the right axial pressure loading and fixing baffle, respectively; the central mounting hole and the peripheral mounting holes are circular holes; the diameter of the central mounting hole is greater than the diameter of the peripheral mounting holes. A left axial pressure loading cylinder 3 and a right axial pressure loading cylinder 12 penetrate through the central mounting holes of the left axial pressure loading and fixing baffle 2 and the right axial pressure loading and fixing baffle 11 respectively, and are welded therewith to form an overall structure; in addition, the left axial pressure loading and fixing baffle 2 and the right axial pressure loading and fixing baffle 11 are connected into a whole by four connecting rods 7 through four peripheral mounting holes on the peripheries thereof, and form an overall frame system together with the support platform; the number of the connecting rods 7 is set according to practical requirements; the number four herein is only an example, but does not represent that the connecting rods can only be four. The left electromagnetic pulse generator 5 is supported by the left electromagnetic pulse generator support 6, and is placed on the support platform 1, wherein the left end of the left electromagnetic pulse generator 5 is freely attached to the right end of the left axial pressure loading piston 4, such that a static axial pressure provided by the left axial pressure loading cylinder 3 is transferred to the left electromagnetic pulse generator 5 by means of the left axial pressure loading piston 4; the left stress wave loading bar 8 is supported by the stress wave loading bar support 9, and is placed on the support platform 1, wherein the left end of the left stress wave loading bar 8 is freely attached to the right end of the left electromagnetic pulse generator 5; on one hand, the static axial pressure transferred to the left electromagnetic pulse generator 5 is further transferred to the left stress wave loading bar 8, and finally applies to the test specimen 29; on the other hand, an incident stress wave generated by the left electromagnetic pulse generator 5 is inputted into the left stress wave loading bar 8, and then propagates along the axial direction thereof until applying a dynamic load from left to right to the test specimen 29; similarly, the right electromagnetic pulse generator 14 is supported by the right electromagnetic pulse generator support 15, and is placed on the support platform 1, wherein the right end of the right electromagnetic pulse generator 14 is freely attached to the left end of the right axial pressure loading piston 13, such that a static axial pressure provided by the right axial pressure loading cylinder 12 is transferred to the right electromagnetic pulse generator 14 by means of the right axial pressure loading piston 13; the right stress wave loading bar 16 is supported by the stress wave loading bar support 9, and is placed on the support platform 1, wherein the right end of the right stress wave loading bar 16 is freely attached to the left end of the right electromagnetic pulse generator 14; on one hand, the static axial pressure transferred to the right electromagnetic pulse generator 14 is further transferred to the right stress wave loading bar 16, and finally applies to the test specimen 29; on the other hand, an incident stress wave generated by the right electromagnetic pulse generator 14 is inputted into the right stress wave loading bar 16, and then propagates along the axial direction thereof until applying a dynamic load from right to left to the test specimen 29;

FIG. 4-8 are schematic views of the structure and connection of the thermal-stress-pore pressure coupled electromagnetic loading triaxial Hopkinson bar system. The confining-pressure loading apparatus includes a confining-pressure loading cylinder enclosure 17, a confining-pressure loading cylinder 18, threaded rods 19, a confining-pressure loading cylinder oil inlet 20, a confining-pressure loading cylinder air outlet 21, a sealing plug of the confining-pressure loading cylinder air outlet 22, and a confining pressure oil pressure gauge 23, wherein a central mounting hole and peripheral mounting holes are disposed in the center of and on the periphery of the confining-pressure loading cylinder enclosure 17, respectively; the diameter of the central mounting hole is about 1 mm greater than the diameter of the stress wave loading bars (the left stress wave loading bar 8 and the right stress wave loading bar 16), which is used to extend the left stress wave loading bar 8 and the right stress wave loading bar 16 through the central mounting hole into the interior of the confining pressure loading cylinder to contact the test specimen 29; the threaded rods 19 penetrate through the peripheral mounting holes of the confining-pressure loading cylinder enclosure, such that the confining-pressure loading cylinder enclosure 17 and the confining-pressure loading cylinder 18 are connected to form an overall structure, and are placed on the support platform 1; in addition, the confining-pressure loading cylinder oil inlet 20 and the confining-pressure loading cylinder air outlet 21 are disposed at an upper part and a lower part of the central mounting hole of the right enclosure of the confining-pressure loading cylinder enclosure 17, respectively; the confining-pressure loading cylinder oil inlet 20 and the confining-pressure loading cylinder air outlet 21 form an intercommunication loop of the confining-pressure loading apparatus (hydraulic oil is pumped into the confining pressure cylinder via the oil inlet; the injection of the hydraulic oil needs to discharge the air in the confining pressure cylinder; therefore, the confining pressure cylinder is in communication with the outside atmosphere via the air outlet, so as to form an intercommunication loop; the sign that the oil is full is that the hydraulic oil flows out from the air outlet); the intercommunication loop is used to pump the hydraulic oil into the confining-pressure loading cylinder 18 to apply a circumferential static confining pressure to the test specimen 29 wrapped in the high temperature resistant anti-wear rubber sleeve 28; the sealing plug of the confining-pressure loading cylinder air outlet 22 is disposed on an outer side of the confining-pressure loading cylinder air outlet 21, which is used to seal the confining-pressure loading cylinder air outlet after the air in the confining-pressure loading cylinder is exhausted; and the static confining pressure is displayed on the confining pressure oil pressure gauge 23 mounted at the upper part of the right enclosure of the confining-pressure loading cylinder enclosure 17.

A thermal control apparatus includes an external power outlet of a thermal system 26 and an intelligent thermal control thermocouple and thermal sensor 27, and is used to heat (20-200° C.) the test specimen 29 and maintain the temperature at a preset value, wherein the intelligent thermal control thermocouple and thermal sensor 27 is an annular structure, and is built in the circumferential cylinder wall of the confining-pressure loading cylinder 18; during heating, the thermal control system controls the intelligent thermal control thermocouple and thermal sensor 27 to raise the temperature of the hydraulic oil pumped into the confining-pressure loading cylinder 18 at a temperature rise rate set according to test requirements, and transfers heat to the test specimen 29 wrapped in the high temperature resistant anti-wear rubber sleeve 28, so as to control the temperature of the test specimen.

A pore pressure loading apparatus includes a left pore pressure pipe 24 and a right pore pressure pipe 25, wherein the diameters and lengths of the left pore pressure pipe 24 and the right pore pressure pipe 25 are both the same; the two pore pressure pipes are built in the right end of the left stress wave loading bar 8 and the left end of the right stress wave loading bar 16 respectively, and directly contact with the loading ends of the test specimen; when a pore pressure is applied, a pore liquid with a preset pressure (0-60 MPa) is injected into the left pore pressure pipe 24, the pore liquid driven by the pore pressure passes through the internally connected pore throat channels in the test specimen 29, and flows out from the right pore pressure pipe 25; and the pore pressure is maintained constant at a preset value.

Figure 9:
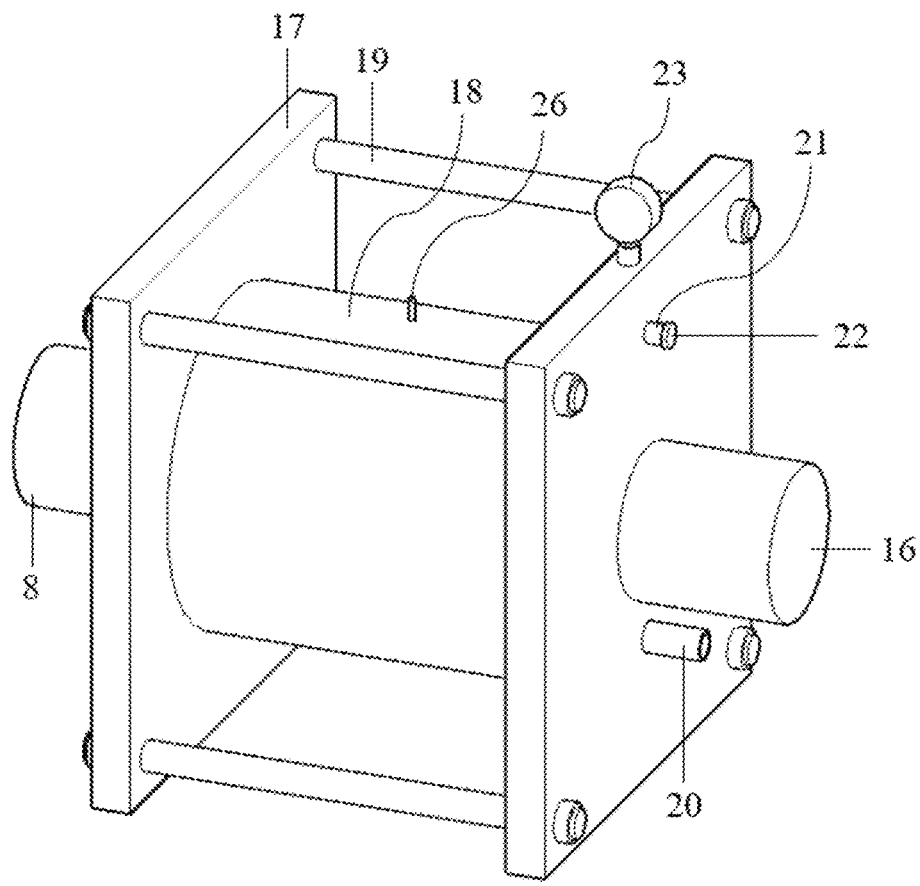
FIG. 9 is a three-dimensional view of a thermal-stress coupled confining-pressure loading apparatus.
Figure 10:
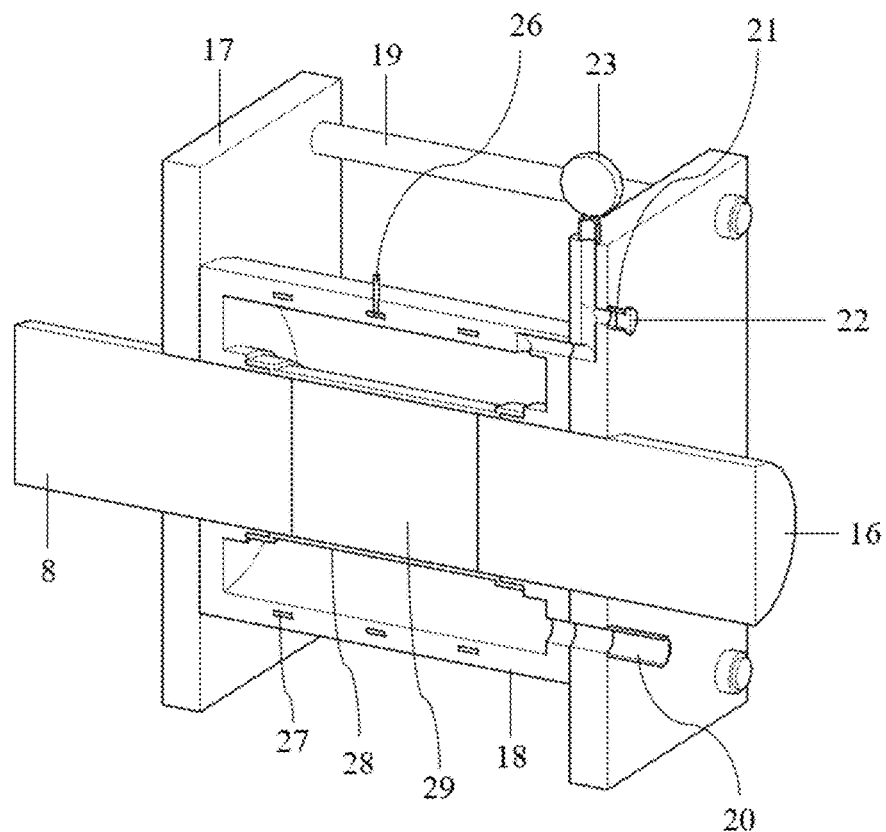
FIG. 10 is a three-dimensional sectional view of the thermal-stress coupled confining-pressure loading apparatus in the front view direction.
Figure 11:
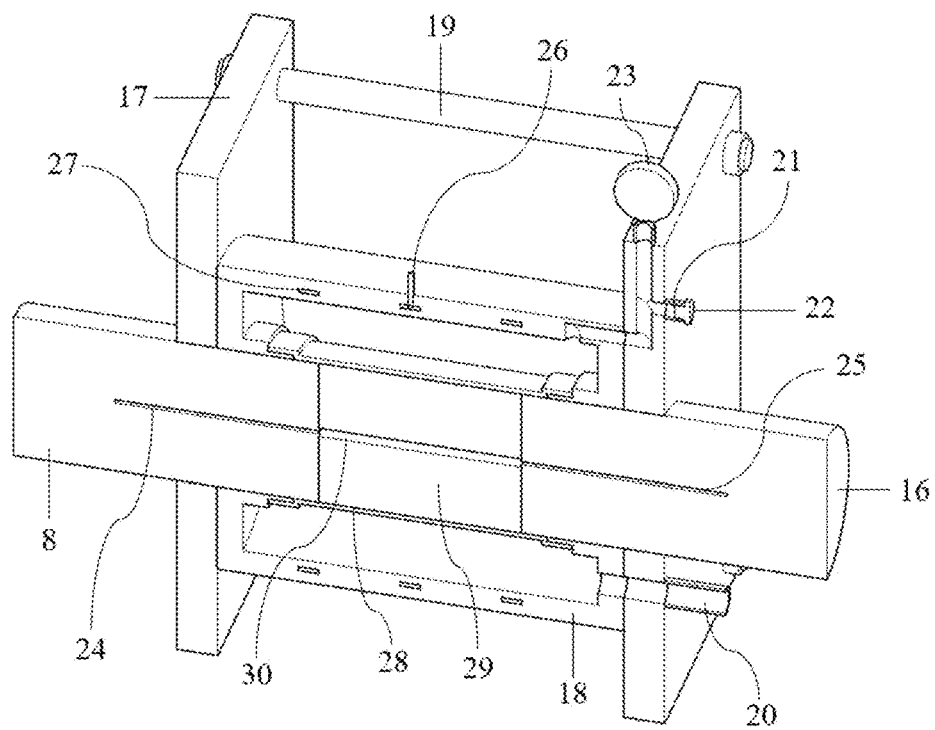
FIG. 11 is a three-dimensional sectional view of a test specimen with a central cylindrical hole in the front view direction under thermal-stress-pore pressure coupled triaxial loading.
Figure 12:
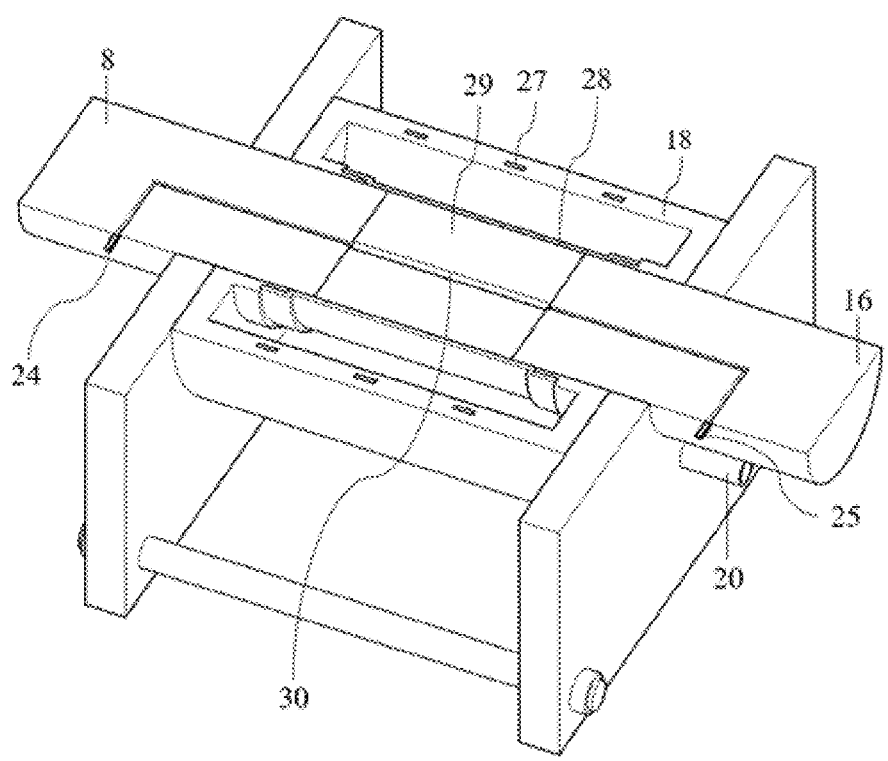
FIG. 12 is a three-dimensional sectional view of the test specimen with a central cylindrical hole in the vertical view direction under thermal-stress-pore pressure coupled triaxial loading.
Figure 13:
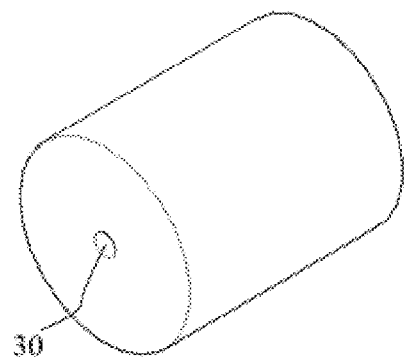
FIG. 13 is a three-dimensional view of the test specimen with a central cylindrical hole.
Figure 14:
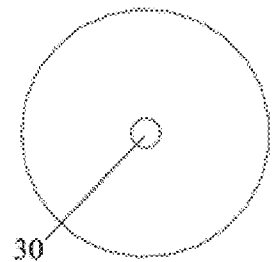
FIG. 14 is a vertical view of the test specimen with a central cylindrical hole.

FIG. 9-10 are schematic views of the structure and connection of a thermal-stress coupled confining-pressure loading apparatus. The confining-pressure loading apparatus includes a confining-pressure loading cylinder enclosure 17, a confining-pressure loading cylinder 18, threaded rods 19, a confining-pressure loading cylinder oil inlet 20, a confining-pressure loading cylinder air outlet 21, a sealing plug of the confining-pressure loading cylinder air outlet 22, and a confining pressure oil pressure gauge 23, wherein a central mounting hole and peripheral mounting holes are disposed in the center of and on the periphery of the confining-pressure loading cylinder enclosure 17, respectively; the diameter of the central mounting hole is about 1mm greater than the diameter of the stress wave loading bars (including the left stress wave loading bar 8 and the right stress wave loading bar 16), which is used to extend the left stress wave loading bar 8 and the right stress wave loading bar 16 through the central mounting hole into the interior of the confining pressure loading cylinder to contact the test specimen 29; the threaded rods 19 penetrate through the peripheral mounting holes of the confining-pressure loading cylinder enclosure 17, such that the confining-pressure loading cylinder enclosure 17 and the confining-pressure loading cylinder 18 are connected to form an overall structure, and are placed on the support platform 1; in addition, the confining-pressure loading cylinder oil inlet 20 and the confining-pressure loading cylinder air outlet 21 are disposed at an upper part and a lower part of the central mounting hole of the right enclosure of the confining-pressure loading cylinder enclosure 17, respectively; the confining-pressure loading cylinder oil inlet 20 and the confining-pressure loading cylinder air outlet 21 form an intercommunication loop of the confining-pressure loading apparatus; the intercommunication loop is used to pump the hydraulic oil into the confining-pressure loading cylinder 18 to apply a circumferential static confining pressure to the test specimen 29 wrapped in the high temperature resistant anti-wear rubber sleeve 28; the sealing plug of the confining-pressure loading cylinder air outlet 22 is disposed on an outer side of the confining-pressure loading cylinder air outlet 21, which is used to seal the confining-pressure loading cylinder air outlet after the air in the confining-pressure loading cylinder 18 is exhausted; and the static confining pressure is displayed on the confining pressure oil pressure gauge 23 mounted at the upper part of the right enclosure of the confining-pressure loading cylinder enclosure 17. The thermal control apparatus includes an external power outlet of a thermal system 26 and an intelligent thermal control thermocouple and thermal sensor 27, and is used to heat (20-200° C.) the test specimen 29 and maintain the temperature at a preset value, wherein the intelligent thermal control thermocouple and thermal sensor 27 is an annular structure, and is built in the circumferential cylinder wall of the confining-pressure loading cylinder 18; during heating, the temperature control system controls the intelligent thermal control thermocouple and thermal sensor to raise the temperature of the hydraulic oil pumped into the confining-pressure loading cylinder 18 at a temperature rise rate set according to test requirements, and transfers heat to the test specimen 29 wrapped in the high temperature resistant anti-wear rubber sleeve 28, so as to control the temperature of the test specimen.

During dynamic impact loading, an electromagnetic pulse generation control system is operated to trigger the left electromagnetic pulse generator 5 and the right electromagnetic pulse generator 14 to synchronously generate and output incident stress waves with the same amplitude and duration; the incident stress waves propagate towards the test specimen 29 along the left and the right stress wave loading bars 8 and 16 respectively, and load a dynamic impact to the test specimen, so as to realize a thermal-stress-pore pressure coupled electromagnetic loading triaxial Hopkinson bar test. It should be noted that during dynamic impact loading, the axial static pressure and the circumferential static pressure remains basically unchanged under the adjustment and control of the servo-controlled axial pressure loading system and the servo-controlled confining pressure loading system, so as to achieve a dynamic triaxial impact loading test under constant static axial pressure and confining pressure conditions. During dynamic impact loading, the incident strain signals and reflected strain signals in the stress wave loading bars are monitored in real time by means of resistance strain gauges 10 adhered at the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing. When the strain signal data monitored by the strain gauges 10 shows that the dynamic compression loads applied to the left and right ends of the test specimen 29 are basically consistent, the dynamic impact loading process of the test specimen 29 can be considered to reach a stress balance state during the thermal-stress-pore pressure coupled electromagnetic loading triaxial Hopkinson bar test. According to one-dimensional strain wave propagation theory, the dynamic compression strength σ(t), the dynamic compression strain rate ἐ'(t), and the dynamic strain ε(t) of the test specimen in the thermal-stress-pore pressure coupled electromagnetic loading triaxial Hopkinson bar test can be calculated with the strain data monitored by the strain gauges 10 using the formulas as follows:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are an elastic modulus, a compressional wave velocity, and a cross-sectional area of the stress wave loading bar, respectively; $A_s$ is a cross-sectional area of the test specimen 29; $L_s$ is a length of the test specimen 29; $\varepsilon_{left\ incident}$ and $\varepsilon_{left\ reflected}$ are the incident strain signal and the reflected strain signal monitored on the left stress wave loading bar 8 by the strain gauges, respectively; and $\varepsilon_{right\ incident}$ and $\varepsilon_{right\ reflected}$ are the incident strain signal and the reflected strain signal monitored on the right stress wave loading bar 16 by the strain gauges, respectively.

Figure 18:
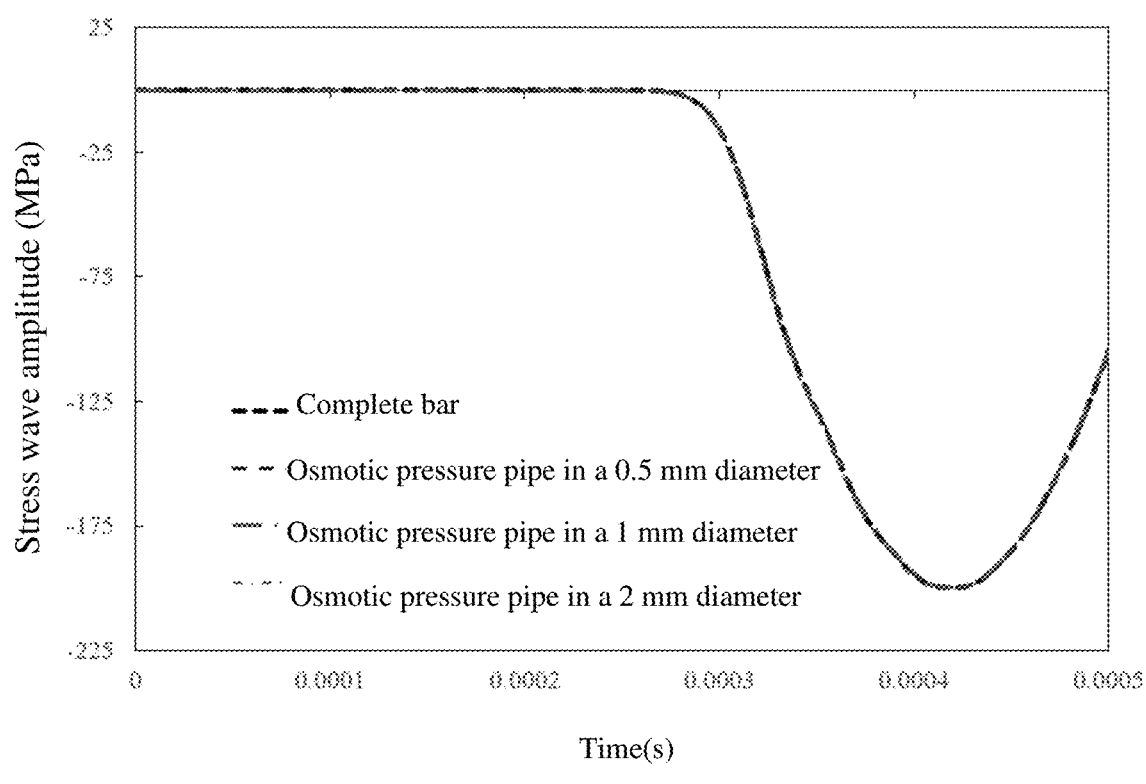
FIG. 18 is a finite element calculation result showing the influence of the diameter of pore pressure pipe on the stress wave propagation in the stress wave loading bar according to the present disclosure.

In addition, it should be noted that due to the introduction of the pore pressure system, the left pore pressure pipe 24 and the right pore pressure pipe 25 need to be disposed at one end of the left and the right stress wave loading bars 8 and 16 adjacent to the test specimen, respectively. The introduction of a pore pressure transmission channel changes the isotropic property of the cylindrical stress wave loading bar to a certain extent and generates a local anisotropic property, and therefore, the influence of the introduction of the pore pressure transmission channel on the propagation of one-dimensional stress waves on the stress wave loading bars needs to be examined. Finite element modeling (taking the software ABAQUS 6.14-5 as an example) calculation shows that: when the diameter of the pore pressure pipes is less than or equal to 2 mm, the influence of the introduction of the pore pressure pipes on the propagation of one-dimensional stress waves on the stress wave loading bars is less than 1% which can be neglected. To be specific, as shown in FIG. 15, when the incident stress wave (which is a half sine wave with the amplitude and duration of 200 MPa and 250 μs, respectively) propagates from left to right along the stress wave loading bar and sequentially passes through the left pore pressure pipe and the right pore pressure pipe in the bar, the difference between the stress wave amplitude monitored at a monitoring point A, namely the center of the cross section, and the stress wave amplitude monitored at the same position of an intact stress wave loading bar with no pore pressure pipe is less than 1% (as shown in FIG. 18).

Figure 15:
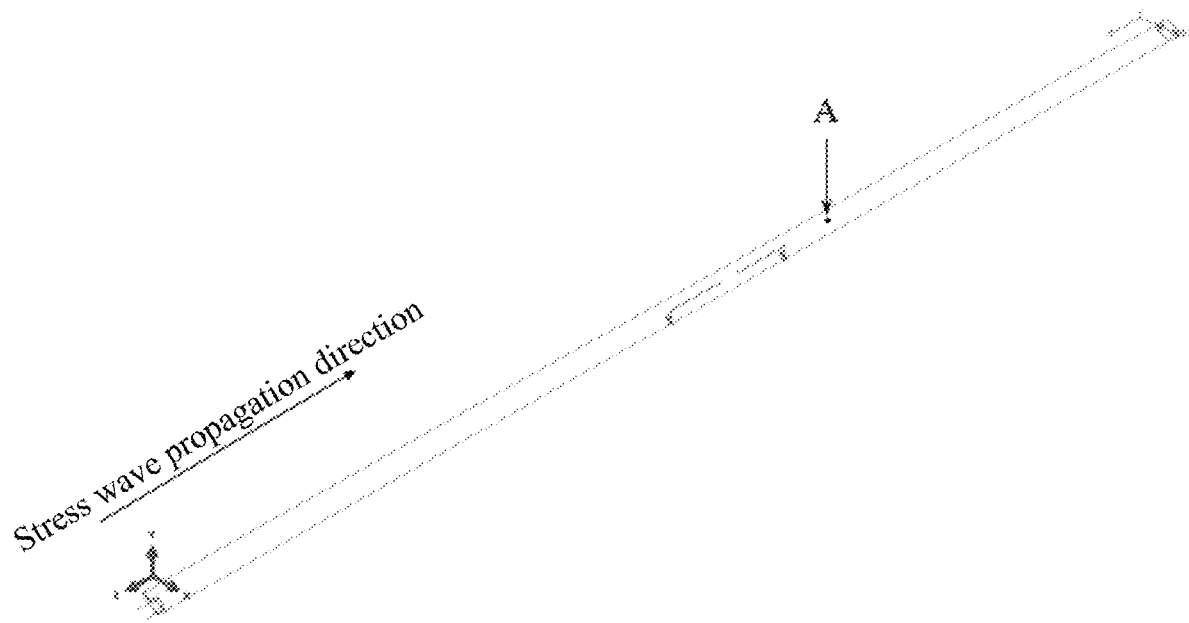
FIG. 15 is a three-dimensional view of a finite element simulation model according to the present disclosure.
Figure 16:
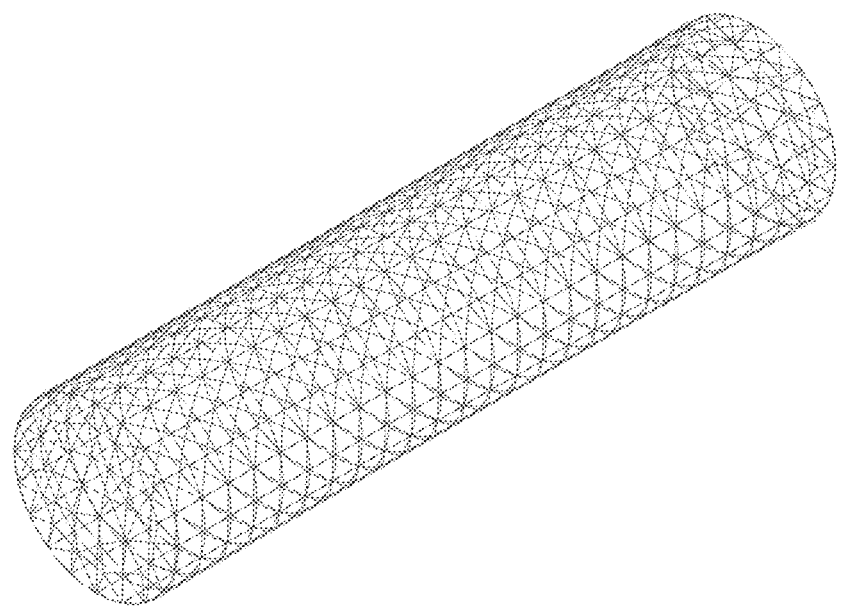
FIG. 16 is a three-dimensional mesh view of an intact stress wave loading bar in finite element simulation according to the present disclosure.

It should be noted that relevant modeling and boundary conditions for the calculation of the numerical model as shown in FIG. 15 are as follows:

As a contrast, first an intact stress wave loading bar model with no pore pressure pipe is established, wherein the length of the stress wave loading bar is 3.05 m, and the diameter is 50 mm; the stress wave loading bar is manufactured from a homogeneous elastic titanium alloy, its density, elastic modulus, Poisson ratio, and compressional wave velocity are 4510 kg/m$^3$, 107.8 GPa, 0.33, and 5000 m/s, respectively; the stress wave loading bar model is meshed with a tetrahedral free mesh division method (a local mesh division result is shown in FIG. 16), and the elements of the meshed model totally is 72832.

Figure 17:
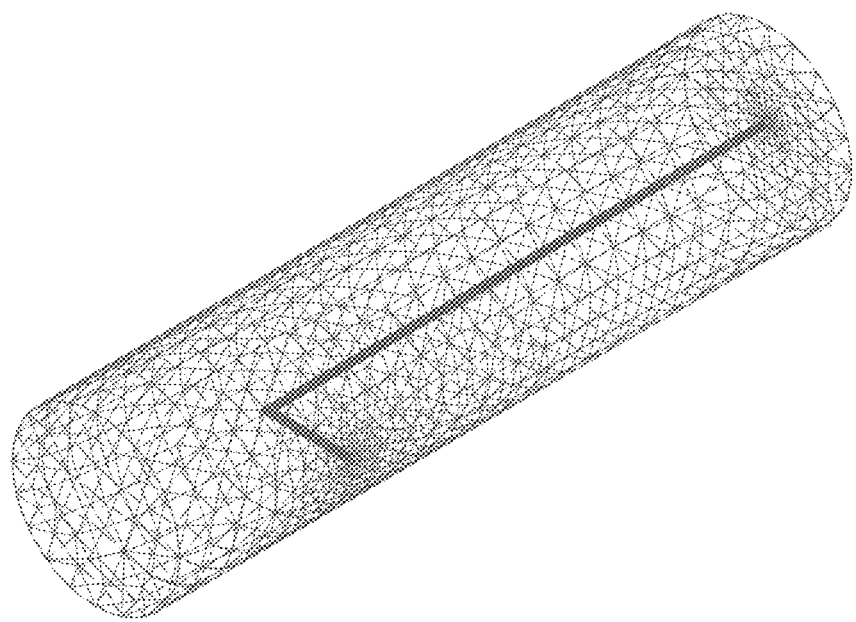
FIG. 17 is a three-dimensional mesh view of the stress wave loading bar with a pore pressure pipe in the finite element simulation according to the present disclosure.

Subsequently, based on the intact stress wave loading bar model, numerical models with the pore pressure pipes in different diameters (i.e., 2 mm, 1 mm, and 0.5 mm) are established, wherein the lengths of the pore pressure pipes in the axial direction of the stress wave loading bar are all 0.15 m; the length and diameter of the stress wave loading bar are 3.05 m and 50 mm, respectively; the material and parameters of the stress wave loading bar are all the same as that of the intact stress wave loading bar model; the pore pressure pipes are meshed with the same mesh division method as the intact stress wave loading bar (a local mesh division result of the pore pressure pipe is shown in FIG. 17), and the elements of the meshed stress wave loading bar models with the pore pressure pipes in the diameters of 2 mm, 1 mm, and 0.5 mm are 290850, 260999, and 299936, respectively.

Figure 2:
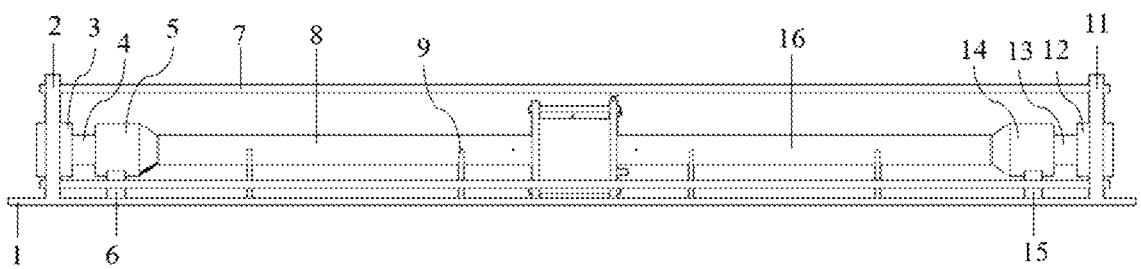
FIG. 2 is a front view of the thermal-stress-pore pressure coupled electromagnetic loading triaxial Hopkinson bar system.

In one embodiment of the present disclosure, a dynamic impact test research is conducted on an intact saturated sandstone specimen under thermal-stress-pore pressure coupled triaxial loads; the apparatus is placed on the support platform 1 with the length, width, and height of 6 m, 0.6 m, and 1 m respectively according to the connection method shown in FIGS. 1-3; the connections and relevant functions of the devices are specifically described as follows: the system centers on the test specimen 29, and is arranged symmetrically on the support platform 1; first the left axial pressure loading and fixing baffle 2 with the width, height, and thickness of 600 mm, 400 mm, and 50 mm is placed at the left end of the support platform 1, wherein the left axial pressure loading cylinder 3 with the diameter and length of 250 mm and 200 mm penetrates through the central mounting hole of the left axial pressure loading and fixing baffle 2, and is welded therewith to form an overall structure; the diameter of the left axial pressure loading piston 4 is 100 mm, and the piston stroke length is 200 mm; the movement of the left axial pressure loading piston is controlled by increasing and decreasing the pressure of the left axial pressure loading cylinder 3; subsequently, the left electromagnetic pulse generator 5 with the diameter and length of 200 mm and 200 mm is supported by the left electromagnetic pulse generator support 5, and is placed on the support platform 1, wherein the left end of the left electromagnetic pulse generator 5 is freely attached to the right end of the left axial pressure loading piston 4, so that a static axial pressure provided by the left axial pressure loading cylinder 3 is transferred to the left electromagnetic pulse generator 5 by means of the left axial pressure loading piston 4; the diameter of the right stress wave output end surface of the left electromagnetic pulse generator 5 is the same as that of the stress wave loading bar (the diameter is 50 mm in the present embodiment); next, the left stress wave loading bar 8 manufactured from TC21 titanium alloy with the length and diameter of 2 m and 50 mm is horizontally placed on the stress wave loading bar support 9, ensuring that the left stress wave loading bar 8 can freely slide on the support; then, the right loading end surface of the left stress wave loading bar 8 is aligned with and closely attached to the left loading surface of the completely saturated sandstone specimen (that is the test specimen 29) with the length and diameter of 50 mm and the porosity of approximately 10%; meanwhile, the left stress wave loading end surface of the left stress wave loading bar 8 is aligned with and closely attached to the right stress wave output end surface of the left electromagnetic pulse generator 5; its main function on one hand is to further transfer the static axial pressure transferred to the left electromagnetic pulse generator 5 to the left stress wave loading bar 8, and finally applies to the sandstone specimen; on the other hand, the incident stress wave generated by the left electromagnetic pulse generator 5 is inputted into the left stress wave loading bar 8, and then propagates along the axial direction thereof until applying a dynamic load from left to right to the sandstone specimen; similarly, the arrangement of the system on the right is the same as that on the left: first, the right axial pressure loading and fixing baffle 11 with the width, height, and thickness of 600 mm, 400 mm, and 50 mm is placed at the right end of the support platform 1, wherein the right axial pressure loading cylinder 12 with the diameter and length of 250 mm and 200 mm penetrates through the central mounting hole of the right axial pressure loading and fixing baffle 11, and is welded therewith to form an overall structure; the diameter of the right axial pressure loading piston 13 is 100 mm, and the piston stroke length is 200 mm; the movement of the right axial pressure loading piston is controlled by increasing and decreasing the pressure of the right axial pressure loading cylinder 12; subsequently, the right electromagnetic pulse generator 14 with the diameter and length of both 200 mm is supported by the right electromagnetic pulse generator support 15, and is placed on the support platform 1, wherein the right end of the right electromagnetic pulse generator 14 is freely attached to the left end of the right axial pressure loading piston 13, so that a static axial pressure provided by the right axial pressure loading cylinder 12 is transferred to the right electromagnetic pulse generator 14 by means of the right axial pressure loading piston 13; the diameter of the left stress wave output end surface of the right electromagnetic pulse generator 14 is the same as that of the stress wave loading bar (the diameter is 50 mm in the present embodiment); next, the right stress wave loading bar 16 manufactured from TC21 titanium alloy with the length and diameter of 2 m and 50 mm is horizontally placed on the stress wave loading bar support 9, ensuring that the right stress wave loading bar 16 can freely slide on the support; then, the left loading end surface of the right stress wave loading bar 16 is aligned with and closely attached to the right loading surface of the sandstone (that is the test specimen 29) with the length and diameter of 50 mm and the porosity of approximately 10%; meanwhile, the right stress wave loading end surface of the right stress wave loading bar 16 is aligned with and closely attached to the left stress wave output end surface of the right electromagnetic pulse generator 14; its main function on one hand is to further transfer the static axial pressure transferred to the right electromagnetic pulse generator 14 to the right stress wave loading bar 16, and finally applies to the sandstone specimen; on the other hand, the incident stress wave generated by the right electromagnetic pulse generator 14 is inputted into the right stress wave loading bar 16, and then propagates along the axial direction thereof until applying a dynamic load from right to left to the sandstone specimen; next, four connecting rods 7 are used to penetrate through four peripheral mounting holes on the peripheries of the left axial pressure loading and fixing baffle 2 and the right axial pressure loading and fixing baffle 11 to connect the loading system into a whole, and form an overall frame system together with the support platform; subsequently, the confining-pressure loading apparatus is placed on the periphery of the sandstone specimen; the specific mounting steps are as follows: first, taking off the saturated sandstone specimen, then, pushing the left axial pressure loading piston and the right axial pressure loading piston to the left end and the right end with no axial pressure loaded respectively, so that the left stress wave loading bar 8 and the right stress wave loading bar 16 can be moved to the left and right respectively, thereby releasing space for installing the confining-pressure loading apparatus; subsequently, sleeving the left and right enclosures of the confining-pressure loading cylinder enclosure 17 (as shown in FIG. 4-8) on the loading ends of the left stress wave loading bar 8 and the right stress wave loading bar 16 respectively; then, sleeving the confining-pressure loading cylinder 18 on the left stress wave loading bar 8 and the right stress wave loading bar 16; next, enabling the saturated sandstone specimen wrapped in the high temperature resistant anti-wear rubber sleeve 28 (for example, 26 type fluorine rubber) to contact the left stress wave loading bar 8 and the right stress wave loading bar 16, and adjusting the sandstone specimen to a symmetric center of the system; subsequently, synchronously controlling, by means of the servo-controlled axial pressure loading system, the left axial pressure loading cylinder 3 and the right axial pressure loading cylinder 12 to slowly pressurize and drive the left axial pressure loading piston 4 and the right axial pressure loading piston 13 to move rightwards and leftwards respectively; thereby, driving the left stress wave loading bar 8 and the right stress wave loading bar 16 to slowly move rightwards and leftwards respectively, and to clamp and apply axial pressures to the saturated sandstone specimen; when the axial pressure reaches 100 KPa, stopping loading and maintaining the axial pressure, so as to ensure that the saturated sandstone specimen and the entire axial pressure loading system are in an axial stable state; next, abutting the left and the right enclosures of the confining-pressure loading cylinder enclosure 17 with the confining-pressure loading cylinder 18, and enabling the confining-pressure loading cylinder 18 to be at the symmetric center of the system, such that the saturated sandstone specimen is located in the center of the confining-pressure loading cylinder 18; subsequently, using the threaded rods 19 to connect the confining-pressure loading cylinder enclosure 17 to the confining-pressure loading cylinder 18, and tightening the threaded rods to form an overall structure. Up to this step, the connection steps of the entire system and the mounting steps of the test specimen are completed; subsequently, the corresponding loading operations can be conducted according to a test design; the specific loading process is as follows: first, synchronously controlling the left axial pressure loading cylinder 3 and the right axial pressure loading cylinder 12 by means of the servo-controlled axial pressure loading system to repressurize the two axial pressure loading cylinders and drive the left axial pressure loading piston 4 and the right axial pressure loading piston 13 to move rightwards and leftwards respectively; then, driving the left stress wave loading bar 8 and the right stress wave loading bar 16 to respectively apply axial pressures to the saturated sandstone specimen at a preset loading rate; when the axial pressure reaches 10 MPa, stopping loading and using the servo-controlled axial pressure loading system to maintain the axial pressure constant; second, using the confining-pressure loading apparatus and its servo-controlled confining pressure loading system to pump the high temperature resistant anti-wear hydraulic oil (for example, HEX T6002) into the confining-pressure loading cylinder 18 at a preset rate through the confining-pressure loading cylinder oil inlet 20; when the hydraulic oil flows out from the confining-pressure loading cylinder air outlet 21, which means that the confining-pressure loading cylinder is already full of the high temperature resistant anti-wear hydraulic oil, tightening the sealing plug of the confining-pressure loading cylinder air outlet 22 to seal the confining-pressure loading cylinder air outlet 21; and when the pressure value on the confining pressure oil pressure gauge 23 mounted on the right enclosure of the confining-pressure loading enclosure 17 reaches the preset confining pressure value 10 MPa, stopping loading and using the servo-controlled confining pressure loading system to maintain the confining pressure constant, such that the circumferential confining pressure applied to the saturated sandstone specimen by means of the high temperature resistant anti-wear rubber sleeve 28 (for example, 26 type fluorine rubber) maintains constant at 10 MPa; third, using the pore pressure loading system to apply a 10 MPa pore pressure to the saturated sandstone specimen from the left stress wave loading bar side by means of the left pore pressure pipe 24; the pore liquid, under the drive of the pore pressure, passes through the internally connected pore throat channels in the saturated sandstone specimen, and is discharged from the right pore pressure pipe 25; when a pressure difference between the pore pressures in the left pore pressure pipe 24 and the right pore pressure pipe 25 maintains constant at 10 MPa, activating the thermal control system, and driving the intelligent thermal control thermocouple and thermal sensor 27 to raise the temperature at the rate of 5° C. per minute; when the temperature of the hydraulic oil in the confining-pressure loading cylinder 18 rises to 90° C., braking the thermal control system to maintain the temperature of the oil in the hydraulic cylinder at 90° C. by two hours, so that the temperature inside the saturated sandstone specimen wrapped in the high temperature resistant anti-wear rubber sleeve (for example, 26 type fluorine rubber) 28 is uniform and maintains constant at 90° C.; up to now, the coupling conditions of applying static axial pressure, confining pressure, pore pressure, and high temperature to the saturated sandstone specimen are completed; thereafter, operating, according to a test design, the electromagnetic pulse generation control system to trigger the left electromagnetic pulse generator 5 and the right electromagnetic pulse generator 14 to synchronously generate and output incident stress waves with the amplitude of 500 MPa and the duration of 400 μs; subsequently, the incident stress waves propagate towards the saturated sandstone specimen along the left and the right stress wave loading bars respectively, and apply dynamic loads to the saturated sandstone specimen, so as to complete a thermal-stress-pore pressure coupled electromagnetic loading triaxial Hopkinson bar test. It should be noted that during dynamic impact loading, the axial static pressure and the circumferential static pressure remains basically unchanged under the control of the servo-controlled axial pressure loading system and the servo-controlled confining pressure loading system, so as to achieve a dynamic triaxial impact loading test under relatively constant static axial pressure and confining pressure conditions.

During dynamic impact loading, the incident strain signals and reflected strain signals in the stress wave loading bars are monitored in real time by means of resistance strain gauges 10 adhered at the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing. When the strain signal data monitored by the strain gauges 10 shows that during the thermal-stress-pore pressure coupled electromagnetic loading triaxial Hopkinson bar test, the dynamic compression loads applied to the left and right ends of the saturated sandstone specimen are basically consistent, the dynamic impact loading process of the saturated sandstone specimen can be considered to reach a stress balance state. According to one-dimensional strain wave propagation theory, the dynamic compression strength σ(t), the dynamic compression strain rate $\dot{\varepsilon}(t)$ and the dynamic axial strain ε(t) of the saturated sandstone material under the coupled effect of the thermal (90° C.)-stress (10 MPa)-pore pressure (10 MPa) can be calculated with the strain data monitored by the strain gauges 10 using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are elastic modulus (158 GPa), compressional wave velocity (5000 m/s), and cross-sectional area (1963.5 mm$^2$) of the stress wave loading bar, respectively; $A_s$ is the cross-sectional area (1924.4 mm$^2$, the actual diameter of the saturated sandstone 29 is 49.5 mm) of the saturated sandstone 29; $L_s$ is the length (50 mm) of the saturated sandstone 29; $\varepsilon_{left\ incident}$ and $\varepsilon_{left\ reflected}$ are the incident strain signal and the reflected strain signal monitored on the left stress wave loading bar 8 by the strain gauge, respectively; and $\varepsilon_{right\ incident}$ and $\varepsilon_{right\ reflected}$ are the incident strain signal and the reflected strain signal monitored on the right stress wave loading bar 16 by the strain gauge, respectively.

In one embodiment of the present disclosure, a dynamic impact test research is conducted on an intact saturated coal specimen under pore pressure-static pressure coupled triaxial loads, wherein the connections and mounting of the test system are the same as that in the above embodiment; the test specimen 29 is replaced with the saturated coal specimen; subsequently, the corresponding loading operations can be conducted according to a test design; the specific loading process is as follows: first, synchronously controlling the left axial pressure loading cylinder 3 and the right axial pressure loading cylinder 12 by means of the servo-controlled axial pressure loading system to re pressurize the two axial pressure loading cylinders and drive the left axial pressure loading piston 4 and the right axial pressure loading piston 13 to move rightwards and leftwards respectively; then, driving the left stress wave loading bar 8 and the right stress wave loading bar 16 to respectively apply axial pressures to the saturated coal specimen (that is the test specimen 29) at a preset loading rate; when the axial pressure reaches 5 MPa, stopping loading and using the servo-controlled axial pressure loading system to maintain the axial pressure constant; second, using the confining-pressure loading apparatus and its servo-controlled confining pressure loading system to pump the anti-wear hydraulic oil (for example, HEX T6002) into the confining-pressure loading cylinder 18 at a preset rate through the confining-pressure loading cylinder oil inlet 20; when the hydraulic oil flows out from the confining-pressure loading cylinder air outlet 21, which means that the confining-pressure loading cylinder is already full of the anti-wear hydraulic oil, tightening the sealing plug of the confining-pressure loading cylinder air outlet 22 to seal the confining-pressure loading cylinder air outlet 21; and when the pressure value on the confining pressure oil pressure gauge 23 mounted on the right enclosure of the confining-pressure loading enclosure 17 reaches the preset confining pressure value 5 MPa, stopping loading and using the servo-controlled confining pressure loading system to maintain the confining pressure constant, such that the circumferential confining pressure applied to the saturated coal specimen by means of an impermeable rubber sleeve 28 (for example, 26 type fluorine rubber) maintains constant at 5 MPa; third, using the pore pressure loading system to apply a 5 MPa pore pressure to the saturated coal specimen from the left stress wave loading bar side by means of the left pore pressure pipe 24; the pore liquid, under the drive of the pore pressure, passes through the internally connected pore throat channels in the saturated coal specimen, and is discharged from the right pore pressure pipe 25; when a pressure difference between the pore pressures in the left pore pressure pipe 24 and the right pore pressure pipe 25 maintains constant at 5 MPa, considering that the coupling condition of applying a static axial pressure, a confining pressure, and a pore pressure to the saturated coal specimen is completed; thereafter, operating, according to a test design, the electromagnetic pulse generation control system to trigger the left electromagnetic pulse generator 5 and the right electromagnetic pulse generator 14 to synchronously generate and output incident stress waves with the amplitude of 300 MPa and the duration of 300 μs; subsequently, the incident stress waves propagate towards the saturated coal specimen along the left and the right stress wave loading bars respectively, and apply dynamic loads to the saturated coal specimen, so as to complete a pore pressure-static pressure coupled triaxial dynamic impact test. It should be noted that during dynamic impact loading, the axial static pressure and the circumferential static pressure remains basically unchanged under the control of the servo-controlled axial pressure loading system and the servo-controlled confining pressure loading system, so as to achieve a dynamic triaxial impact loading test under relatively constant static axial pressure and confining pressure conditions. During dynamic impact loading, the incident strain signals and the reflected strain signals in the stress wave loading bars are monitored in real time by means of the resistance strain gauges 10 adhered at the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing. When the strain signal data monitored by the strain gauges 10 shows that during the pore pressure-static pressure coupled electromagnetic loading triaxial Hopkinson bar test, the dynamic compression loads applied to the left and right ends of the saturated coal specimen are basically consistent, the dynamic impact loading process of the saturated coal specimen can be considered to reach a stress balance state. According to one-dimensional strain wave propagation theory, the dynamic compression strength σ(t), the dynamic compression strain rate ε̇(t), and the dynamic axial strain ε(t) of the saturated coal rock material under the coupled effect of static pressure (5 MPa) and pore pressure (5 MPa) can be calculated with the strain data monitored by the strain gauges 10 using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are the elastic modulus (107.8 GPa), compressional wave velocity (5000 m/s), and cross-sectional area (1963.5 mm2) of the stress wave loading bar, respectively; As is the cross-sectional area (1932.2 mm$^2$, the actual diameter of the saturated coal rock is 49.6 mm) of the saturated coal specimen; Ls is the length (50 mm) of the saturated coal specimen; $\varepsilon_{left\ incident}$ and $\varepsilon_{left\ reflected}$ are the incident strain signal and the reflected strain signal monitored on the left stress wave loading bar 8 by the strain gauge, respectively; and $\varepsilon_{right\ incident}$ and $\varepsilon_{right\ reflected}$ are the incident strain signal and the reflected strain signal monitored on the right stress wave loading bar 16 by the strain gauge, respectively.

In one embodiment of the present disclosure, a dynamic impact test research is conducted on a granite specimen with a central cylindrical hole under thermal-stress-internal pressure coupled triaxial loads, wherein the connections and mounting of the test system are the same as that in the above embodiment; the test specimen 29 is replaced with the granite specimen with a central cylindrical hole (the diameter of the central cylindrical hole 30 is 5 mm, as shown in FIGS. 9-12); subsequently, the corresponding loading operations can be conducted according to a test design; the specific loading process is as follows: first, synchronously controlling the left axial pressure loading cylinder 3 and the right axial pressure loading cylinder 12 by means of the servo-controlled axial pressure loading system to repressurize the two axial pressure loading cylinders and drive the left axial pressure loading piston 4 and the right axial pressure loading piston 13 to move rightwards and leftwards respectively; then, driving the left stress wave loading bar 8 and the right stress wave loading bar 16 to respectively apply axial pressures to the granite specimen with a central cylindrical hole 30 of 5 mm in diameter at a preset loading rate; when the axial pressure reaches 20 MPa, stopping loading and using the servo-controlled axial pressure loading system to maintain the axial pressure constant; second, using the confining-pressure loading apparatus and its servo-controlled confining pressure loading system to pump the high temperature resistant anti-wear hydraulic oil (for example, HEX T6002) into the confining-pressure loading cylinder 18 at a preset rate through the confining-pressure loading cylinder oil inlet 20; when the hydraulic oil flows out from the confining-pressure loading cylinder air outlet 21, which means that the confining-pressure loading cylinder is already full of the high temperature resistant anti-wear hydraulic oil, tightening the sealing plug of the confining-pressure loading cylinder air outlet 22 to seal the confining-pressure loading cylinder air outlet 21; and when the pressure value on the confining pressure oil pressure gauge 23 mounted on the right enclosure of the confining-pressure loading enclosure 17 reaches the preset confining pressure value 20 MPa, stopping loading and using the servo-controlled confining pressure loading system to maintain the confining pressure constant, such that the circumferential confining pressure applied to the granite specimen with a central cylindrical hole 30 of 5 mm in diameter by means of the high temperature resistant anti-wear rubber sleeve (for example, 26 type fluorine rubber) 28 maintains constant at 20 MPa; third, using the pore pressure loading system to apply a 5 MPa internal pressure to the granite specimen with a central cylindrical hole 30 of 5 mm in diameter by means of the left pore pressure pipe 24 and the right pore pressure pipe 25; when the internal pressure of the central cylindrical hole 30 is constant at 5 MPa, activating the thermal control system, and driving the intelligent thermal control thermocouple and thermal sensor 27 to raise the temperature at the rate of 6° C. per minute; when the temperature of the hydraulic oil in the confining-pressure loading cylinder 18 rises to 80° C., braking the thermal control system to maintain the temperature of the oil in the hydraulic cylinder at 80° C. by two hours, so that the temperature inside the granite specimen with a central cylindrical hole 30 of 5 mm in diameter, which is wrapped in the high temperature resistant anti-wear rubber sleeve (for example, 26 type fluorine rubber) 28, is uniform and maintains constant at 80° C.; up to now, the coupling conditions of applying a static axial pressure, a confining pressure, an internal pressure, and a high temperature to the granite specimen with a central cylindrical hole 30 of 5 mm in diameter are completed; thereafter, operating, according to a test design, the electromagnetic pulse generation control system to trigger the left electromagnetic pulse generator 5 and the right electromagnetic pulse generator 14 to synchronously generate and output incident stress waves with the amplitude of 400 MPa and the duration of 300 μs; subsequently, the incident stress waves propagate towards the granite specimen with a central cylindrical hole 30 of 5 mm in diameter along the left and the right stress wave loading bars respectively, and apply dynamic loads to the granite specimen, so as to complete a thermal-stress-internal pressure coupled electromagnetic loading triaxial Hopkinson bar test. It should be noted that during dynamic impact loading, the axial static pressure and the circumferential static pressure remains basically unchanged under the control of the servo-controlled axial pressure loading system and the servo-controlled confining pressure loading system, so as to achieve a dynamic triaxial impact loading test under relatively constant static axial pressure and confining pressure conditions. During dynamic impact loading, the incident strain signals and the reflected strain signals in the stress wave loading bars are monitored in real time by means of the resistance strain gauges 10 adhered at the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing. When the strain signal data monitored by the strain gauges 10 shows that during the thermal-stress-internal pressure coupled electromagnetic loading triaxial Hopkinson bar test, the dynamic compression loads applied to the left and right ends of the granite specimen with a central cylindrical hole 30 of 5 mm in diameter are basically consistent, the dynamic impact loading process of the granite specimen with a central cylindrical hole 30 of 5 mm in diameter can be considered to reach a stress balance state. According to one-dimensional strain wave propagation theory, the dynamic compression strength σ(t), the dynamic compression strain rate $\dot{\varepsilon}(t)$, and the strain ε(t) of the granite specimen with a central cylindrical hole 30 of 5 mm in diameter under the coupled effect of the thermal (80° C.)-stress (20 MPa)-internal pressure of the central cylindrical hole (5 MPa) can be calculated with the strain data monitored by the strain gauges 10 using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are elastic modulus (158 GPa), compressional wave velocity (5000 m/s), and cross-sectional area (1963.5 mm²) of the stress wave loading bar, respectively; As is a cross-sectional area (1943.86 mm², the diameter is 50 mm) of the granite specimen with a central cylindrical hole 30 of 5 mm in diameter; Ls is a length (50 mm) of the granite specimen with a central cylindrical hole 30 of 5 mm in diameter; $\varepsilon_{left\ incident}$ and $\varepsilon_{left\ reflected}$ are the incident strain signal and the reflected strain signal monitored on the left stress wave loading bar 8 by the strain gauge, respectively; and $\varepsilon_{right\ incident}$ and $\varepsilon_{right\ reflected}$ are the incident strain signal and the reflected strain signal monitored on the right stress wave loading bar 16 by the strain gauge, respectively.

In one embodiment of the present disclosure, a dynamic impact test research is conducted on a shale specimen with a central cylindrical hole under static pressure-in-hole pressure coupled triaxial loads, wherein the connections and mounting of the test system are the same as that in the above embodiment; the test specimen 29 is replaced with the shale specimen with a central cylindrical hole (the diameter of the central cylindrical hole 30 is 8 mm, as shown in FIGS. 11-14); subsequently, the corresponding loading operations can be conducted according to a test design; the specific loading process is as follows: first, synchronously controlling the left axial pressure loading cylinder 3 and the right axial pressure loading cylinder 12 by means of the servo-controlled axial pressure loading system to repressurize the two axial pressure loading cylinders and drive the left axial pressure loading piston 4 and the right axial pressure loading piston 13 to move rightwards and leftwards respectively; then, driving the left stress wave loading bar 8 and the right stress wave loading bar 16 to respectively apply axial pressures to the shale specimen with a central cylindrical hole 30 of 8 mm in diameter at a preset loading rate; when the axial pressure reaches 30 MPa, stopping loading and using the servo-controlled axial pressure loading system to maintain the axial pressure constant; second, using the confining-pressure loading apparatus and its servo-controlled confining pressure loading system to pump the anti-wear hydraulic oil (for example, HEX T6002) into the confining-pressure loading cylinder 18 at a preset rate through the confining-pressure loading cylinder oil inlet 20; when the hydraulic oil flows out from the confining-pressure loading cylinder air outlet 21, which means that the confining-pressure loading cylinder is already full of the anti-wear hydraulic oil, tightening the sealing plug of the confining-pressure loading cylinder air outlet 22 to seal the confining-pressure loading cylinder air outlet 21; and when the pressure value on the confining pressure oil pressure gauge 23 mounted on the right enclosure of the confining-pressure loading enclosure 17 reaches the preset confining pressure value 30 MPa, stopping loading and using the servo-controlled confining pressure loading system to maintain the confining pressure constant, such that the circumferential confining pressure applied to the shale specimen with a central cylindrical hole 30 of 8 mm in diameter by means of an impermeable rubber sleeve 28 (for example, 26 type fluorine rubber) maintains constant at 30 MPa; third, using the pore pressure loading system to apply a 10 MPa internal pressure to the shale specimen with a central cylindrical hole 30 of 8 mm in diameter by means of the left pore pressure pipe 24 and the right pore pressure pipe 25; when the internal pressure of the central cylindrical hole 30 is constant at 10 MPa, considering that the condition of applying the coupled effect of a static axial pressure, a confining pressure, and an in-hole pressure to the shale specimen with a central cylindrical hole 30 of 8 mm in diameter is completed; thereafter, operating, according to a test design, the electromagnetic pulse generation control system to trigger the left electromagnetic pulse generator 5 and the right electromagnetic pulse generator 14 to synchronously generate and output incident stress waves with the amplitude of 500 MPa and the duration of 400 μs; subsequently, the incident stress waves propagate towards the shale specimen with a central cylindrical hole 30 of 8 mm in diameter along the left and the right stress wave loading bars respectively, and apply dynamic loads to the shale specimen, so as to complete a static pressure-in-hole pressure coupled electromagnetic loading triaxial Hopkinson bar test. It should be noted that during dynamic impact loading, the axial static pressure and the circumferential static pressure remains basically unchanged under the control of the servo-controlled axial pressure loading system and the servo-controlled confining pressure loading system, so as to achieve a dynamic triaxial impact loading test under relatively constant static axial pressure and confining pressure conditions. During dynamic impact loading, the incident strain signals and the reflected strain signals in the stress wave loading bars are monitored in real time by means of the resistance strain gauges 10 adhered at the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing. When the strain signal data monitored by the strain gauges 10 shows that during the static pressure-in-hole pressure coupled electromagnetic loading triaxial Hopkinson bar test, the dynamic compression loads applied to the left and right ends of the shale specimen with a central cylindrical hole 30 of 8 mm in diameter are basically consistent, the dynamic impact loading process of the hale specimen with a central cylindrical hole 30 of 8 mm in diameter can be considered to reach a stress balance state. According to one-dimensional strain wave propagation theory, the dynamic compression strength σ(t), the dynamic compression strain rate $\dot{\varepsilon}(t)$, and the strain ε(t) of the hale specimen with a central cylindrical hole 30 of 8 mm in diameter under the coupling effect of the static pressure (30 MPa) and the internal pressure of the central cylindrical hole (10 MPa) can be calculated with the strain data monitored by the strain gauges 10 using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t (\varepsilon_{left\ incident} + \varepsilon_{right\ incident} - \varepsilon_{left\ reflected} - \varepsilon_{right\ reflected})$$

wherein E, C, and A are the elastic modulus (107.8 GPa), compressional wave velocity (5000 m/s), and cross-sectional area (1963.5 mm²) of the stress wave loading bar, respectively; $A_s$ is a cross-sectional area (1881.94 mm², the diameter is 50 mm) of the shale specimen with a central cylindrical hole 30 of 8 mm in diameter; $L_s$ is a length (50 mm) of the shale specimen with a central cylindrical hole 30 of 8 mm in diameter; $\varepsilon_{left\ incident}$ and $\varepsilon_{left\ reflected}$ are the incident strain signal and the reflected strain signal monitored on the left stress wave loading bar 8 by the strain gauge, respectively; and $\varepsilon_{right\ incident}$ and $\varepsilon_{right\ reflected}$ are the incident strain signal and the reflected strain signal monitored on the right stress wave loading bar 16 by the strain gauge, respectively.

The present disclosure is described in detail above with reference to specific preferred embodiments. However, the specific embodiments of the present disclosure are not considered to be limited by the descriptions only. For a person skilled in the art, any simple deductions or substitutions made without departing from the concept of the present disclosure should be all concluded in the protection scope of the present disclosure.

What is claimed is:

1. A thermal-stress-pore pressure coupled electromagnetic loading triaxial Hopkinson bar system, comprising:
   a support platform, a left axial pressure loading and fixing baffle, a left axial pressure loading cylinder, a left axial pressure loading piston, a left electromagnetic pulse generator, a left electromagnetic pulse generator support, connecting rods, a left stress wave loading bar, a stress wave loading bar support, resistance strain gauges, a right axial pressure loading and fixing baffle, a right axial pressure loading cylinder, a right axial pressure loading piston, a right electromagnetic pulse generator, a right electromagnetic pulse generator support, a right stress wave loading bar, a confining-pressure loading cylinder enclosure, a confining-pressure loading cylinder, a threaded rod, a confining-pressure loading cylinder oil inlet, a confining-pressure loading cylinder air outlet, a sealing plug of the confining-pressure loading cylinder air outlet, a confining pressure oil pressure gauge, a left pore pressure pipe, a right pore pressure pipe, an external power outlet of a thermal system, an intelligent thermal control thermocouple and thermal sensor, a rubber sleeve, and a test specimen;
   the system centers on the test specimen, and is arranged symmetrically; the left axial pressure loading and fixing baffle and the right axial pressure loading and fixing baffle are fixed at a left end and a right end of the support platform, respectively; a central mounting hole and peripheral mounting holes are disposed in centers of and on peripheries of the left axial pressure loading and fixing baffle and the right axial pressure loading and fixing baffle, respectively; the left axial pressure loading cylinder and the right axial pressure loading cylinder respectively penetrate through the central mounting hole of each of the left axial pressure loading and fixing baffle and the right axial pressure loading and fixing baffle, and are welded therewith to form an overall structure; in addition, the left axial pressure loading and fixing baffle and the right axial pressure loading and fixing baffle are connected into a hole by the connecting rods through the peripheral mounting holes on the peripheries thereof, and form an overall frame system together with the support platform; the left electromagnetic pulse generator is supported by the left electromagnetic pulse generator support, and is placed on the support platform, wherein a left end of the left electromagnetic pulse generator is freely attached to a right end of the left axial pressure loading piston, such that a static axial pressure provided by the left axial pressure loading cylinder is transferred to the left electromagnetic pulse generator by means of the left axial pressure loading piston; the left stress wave loading bar is supported by the stress wave loading bar support, and is placed on the support platform, wherein a left end of the left stress wave loading bar is freely attached to a right end of the left electromagnetic pulse generator; on one hand, the static axial pressure transferred to the left electromagnetic pulse generator is further transferred to the left stress wave loading bar, and finally applies to the test specimen; on the other hand, an incident stress wave generated by the left electromagnetic pulse generator is inputted into the left stress wave loading bar, and then propagates along an axial direction thereof until applying a dynamic load from left to right to the test specimen;

the right electromagnetic pulse generator is supported by the right electromagnetic pulse generator support, and is placed on the support platform, wherein a right end of the right electromagnetic pulse generator is freely attached to a left end of the right axial pressure loading piston, such that a static axial pressure provided by the right axial pressure loading cylinder is transferred to the right electromagnetic pulse generator by means of the right axial pressure loading piston; the right stress wave loading bar is supported by the stress wave loading bar support, and is placed on the support platform, wherein a right end of the right stress wave loading bar is freely attached to a left end of the right electromagnetic pulse generator; on one hand, the static axial pressure transferred to the right electromagnetic pulse generator is further transferred to the right stress wave loading bar, and finally applies to the test specimen; on the other hand, an incident stress wave generated by the right electromagnetic pulse generator is inputted into the right stress wave loading bar, and then propagates along the axial direction thereof until applying a dynamic load from right to left to the test specimen;

the resistance strain gauges are pasted on the left stress wave loading bar and the right stress wave loading bar, respectively;

the system further comprises a confining-pressure loading apparatus which comprises the confining-pressure loading cylinder enclosure, the confining-pressure loading cylinder, the threaded rod, the confining-pressure loading cylinder oil inlet, the confining-pressure loading cylinder air outlet, the sealing plug of the confining-pressure loading cylinder air outlet, and the confining pressure oil pressure gauge, wherein central mounting hole and peripheral mounting holes are disposed in a center of and on a periphery of the confining-pressure loading cylinder enclosure respectively, which are used to extend the left stress wave loading bar and the right stress wave loading bar through the central mounting hole into an interior of the confining pressure loading cylinder to contact the test specimen; the threaded rods penetrate through the peripheral mounting holes of the confining-pressure loading cylinder enclosure, such that the confining-pressure loading cylinder enclosure and the confining-pressure loading cylinder are connected to form an overall structure, and are placed on the support platform; in addition, the confining-pressure loading cylinder oil inlet and the confining-pressure loading cylinder air outlet are disposed at an upper part and a lower part of the central mounting hole of a right enclosure of the confining-pressure loading cylinder enclosure, respectively; the confining-pressure loading cylinder oil inlet and the confining-pressure loading cylinder air outlet form an intercommunication loop of the confining-pressure loading apparatus; the intercommunication loop is used to pump hydraulic oil into the confining-pressure loading cylinder to apply a circumferential static confining pressure to the test specimen wrapped in the rubber sleeve; the sealing plug of the confining-pressure loading cylinder air outlet is disposed on an outer side of the confining-pressure loading cylinder air outlet; and the static confining pressure is displayed on the confining pressure oil pressure gauge;

the system further comprises a thermal control apparatus; the thermal control apparatus comprises the external power outlet of a thermal system and the intelligent thermal control thermocouple and thermal sensor, and is used to heat the test specimen and maintain a temperature at a preset value; during heating, a control system controls the intelligent thermal control thermocouple and thermal sensor to raise a temperature of the hydraulic oil pumped into the confining-pressure loading cylinder at a temperature rise rate set according to test requirement, and transfers heat to the test specimen wrapped in the rubber sleeve; the control system controls the thermocouple, and sets a temperature rise rate and a temperature range; then, the intelligent thermal control thermocouple and thermal sensor feeds back a real time temperature to a display system, ensuring to heat to a preset temperature; after heating to the preset temperature, a rock dynamics test is conducted, achieving in-situ heating the test specimen to a specified temperature.

2. The thermal-stress-pore pressure coupled electromagnetic loading triaxial Hopkinson bar system according to claim 1, further comprising a pore pressure loading apparatus; the pore pressure loading apparatus comprises the left pore pressure pipe and the right pore pressure pipe, wherein diameters and lengths of the left pore pressure pipe and the right pore pressure pipe are both the same; the left pore pressure pipe and the right pore pressure pipe are built in a right end of the left stress wave loading bar and a left end of the right stress wave loading bar respectively, and directly contact loading ends of the test specimen; when a pore pressure is applied, a pore liquid with a preset pressure is injected into the left pore pressure pipe; the pore liquid, under a drive of the pore pressure, passes through internally connected pore throat channels inside the test specimen, and is discharged from the right pore pressure pipe; and the pore pressure is maintained constant at a preset value.

3. The thermal-stress-pore pressure coupled electromagnetic loading triaxial Hopkinson bar system according to claim 1, wherein a diameter of the central mounting hole of the confining-pressure loading cylinder enclosure is 1±0.1 mm greater than a diameter of the left stress wave loading bar and the right stress wave loading bar.

4. The thermal-stress-pore pressure coupled electromagnetic loading triaxial Hopkinson bar system according to claim 1, wherein the intelligent thermal control thermocouple and thermal sensor is an annular structure, and is built in a circumferential cylinder wall of the confining-pressure loading cylinder; the temperature rise rate of the intelligent thermal control thermocouple and thermal sensor is controlled by the control system; and the intelligent thermal control thermocouple and thermal sensor feeds back a real time temperature to the display system, ensuring to heat to the preset temperature.

5. The thermal-stress-pore pressure coupled electromagnetic loading triaxial Hopkinson bar system according to claim 1, wherein the central mounting holes and peripheral mounting holes of the left axial pressure loading and fixing baffle, the right axial pressure loading and fixing baffle, and the confining-pressure loading cylinder enclosure are all circular holes.

6. The thermal-stress-pore pressure coupled electromagnetic loading triaxial Hopkinson bar system according to claim 1, wherein the left axial pressure loading and fixing baffle and the right axial pressure loading and fixing baffle are connected into a hole by four connecting rods through four circular holes on the peripheries thereof, and form an overall frame system together with the support platform.

7. The thermal-stress-pore pressure coupled electromagnetic loading triaxial Hopkinson bar system according to claim 1, wherein the resistance strain gauges are disposed at central positions of the left stress wave loading bar and the right stress wave loading bar.

8. The thermal-stress-pore pressure coupled electromagnetic loading triaxial Hopkinson bar system according to claim 1, wherein the confining pressure oil pressure gauge is disposed at an upper part of the right enclosure of the confining-pressure loading cylinder enclosure.

9. The thermal-stress-pore pressure coupled electromagnetic loading triaxial Hopkinson bar system according to claim 1, wherein the left stress wave loading bar and the right stress wave loading bar freely slide on the stress wave loading bar support.

10. A test method for a thermal-stress-pore pressure coupled electromagnetic loading triaxial Hopkinson bar system, using the system according to claim 1 to conduct a test, and comprising the following steps:

first, a servo-controlled axial pressure loading system is used to synchronously control the left axial pressure loading cylinder and the right axial pressure loading cylinder to boost the pressures of the two axial pressure loading cylinders and drive the left axial pressure loading piston and the right axial pressure loading piston to move rightwards and leftwards respectively, so as to push the left stress wave loading bar and the right stress wave loading bar to apply axial pressures to the test specimen at a preset loading rate, respectively; when the axial pressure reaches a preset value, stopping loading and using the servo-controlled axial pressure loading system to maintain the axial pressure stable;

second, using servo-controlled confining pressure loading system to pump anti-wear hydraulic oil into the confining-pressure loading cylinder at a preset rate by means of a confining-pressure loading cylinder oil inlet; when the hydraulic oil flows out from the confining-pressure loading cylinder air outlet, which means that the confining-pressure loading cylinder is already full of the anti-wear hydraulic oil, tightening the sealing plug of the confining-pressure loading cylinder air outlet to seal the confining-pressure loading cylinder air outlet, and continuously applying the confining pressure; when a pressure value on the oil pressure gauge reaches a preset confining pressure value, stopping loading and using the servo-controlled confining pressure loading system to maintain the confining pressure stable, such that a circumferential confining pressure applied to the test specimen by means of an impermeable rubber sleeve maintains stable at a preset value; third, using the pore pressure loading system to apply a pore pressure to the test specimen by means of the left pore pressure pipe and the right pore pressure pipe; when a pressure difference between the pore pressures in the left pore pressure pipe and the right pore pressure pipe maintains stable at a preset value, activating the thermal control system, and driving the intelligent thermal control thermocouple and thermal sensor to heat at a preset rate; when the temperature of the hydraulic oil in the confining-pressure loading cylinder rises to a preset temperature, braking the thermal control system to maintain the temperature of the oil in the hydraulic cylinder at the preset experimental temperature by two hours, so that the temperature inside the test specimen wrapped in the high temperature resistant anti-wear rubber sleeve is uniform and maintains constant at the preset temperature, so as to complete the condition of applying the coupled effect of a static axial pressure, a confining pressure, a pore pressure, and a temperature to the test specimen; and fourth, operating, according to a test design, an electromagnetic pulse generation control system to drive the left electromagnetic pulse generator and the right electromagnetic pulse generator to synchronously generate and output incident stress waves; subsequently, enabling the incident stress waves to propagate towards the test specimen along the left and the right stress wave loading bars respectively, and loading a dynamic impact to the test specimen, so as to achieve a thermal-stress-pore pressure coupled electromagnetic loading triaxial Hopkinson bar test, during dynamic impact loading, an incident strain signal and a reflected strain signal in the stress wave loading bars are monitored in real time by means of the resistance strain gauges adhered at central positions of the left and the right loading bars; when the strain signal data monitored by the strain gauges shows that during the thermal-stress-pore pressure coupled electromagnetic loading triaxial Hopkinson bar test, the dynamic compression loads applied to left and right ends of the test specimen are consistent, the dynamic impact loading process of the test specimen can be considered to reach a stress balance state; according to one-dimensional strain wave propagation theory, a dynamic compression strength σ(t), a dynamic compression strain rate ε̇(t), and a dynamic axial strain ε(t) of the test specimen can be calculated with the strain data monitored by the strain gauges using the following formulas:

$$\sigma(t) = \frac{EA}{2A_s}(\varepsilon_{left\ incident} + \varepsilon_{right\ incident} + \varepsilon_{left\ reflected} + \varepsilon_{right\ reflected})$$

$$\dot{\varepsilon}(t) = \frac{C}{L_s}(\varepsilon_{left\ incident} + \varepsilon_{right\ incident} - \varepsilon_{left\ reflected} - \varepsilon_{right\ reflected})$$

$$\varepsilon(t) = \frac{C}{L_s}\int_0^t(\varepsilon_{left\ incident} + \varepsilon_{right\ incident} - \varepsilon_{left\ reflected} - \varepsilon_{right\ reflected})$$

wherein E, C, and A are elastic modulus, compressional wave velocity, and cross-sectional area of the stress wave loading bar, respectively; $A_s$ is a cross-sectional area of the test specimen; $L_s$ is a length of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

11. The test method for a thermal-stress-pore pressure coupled electromagnetic loading triaxial Hopkinson bar system according to claim 10, wherein the resistance strain gauges transmit the incident strain signals and the reflected strain signals in the stress wave loading bars to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing.

* * * * *